US012750949B2

(12) United States Patent
Buchling Rego et al.

(10) Patent No.: US 12,750,949 B2
(45) Date of Patent: Sep. 29, 2026

(54) TAMPER-DETECT ASSEMBLIES INCLUDING HEAT SINK COVERS WITH INTEGRATED TAMPER-DETECT CIRCUITRY

(71) Applicant: INTERNATIONAL BUSINESS MACHINES CORPORATION, Armonk, NY (US)

(72) Inventors: Philipp K. Buchling Rego, Wappingers Falls, NY (US); Sushumna Iruvanti, Wappingers Falls, NY (US); Jeffrey Allen Zitz, Poughkeepsie, NY (US); Steven Paul Ostrander, Poughkeepsie, NY (US); Thomas Anthony Wassick, LaGrangeville, NY (US); William Santiago-Fernandez, Hopewell Junction, NY (US); Nihad Hadzic, Poughkeepsie, NY (US); James Busby, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 18/469,606

(22) Filed: Sep. 19, 2023

(65) Prior Publication Data

US 2025/0098062 A1 Mar. 20, 2025

(51) Int. Cl.

*H05K 1/02* (2006.01)
*G06F 21/87* (2013.01)
*H05K 3/00* (2006.01)

(52) U.S. Cl.

CPC ........... *H05K 1/0275* (2013.01); *G06F 21/87* (2013.01); *H05K 1/0203* (2013.01); *H05K 3/0061* (2013.01); *H05K 2201/10151* (2013.01)

(58) Field of Classification Search

CPC .. H05K 1/0275; H05K 5/0208; H05K 1/0203; H05K 2201/10151; G06F 21/86

See application file for complete search history.

(56) References Cited

U.S. PATENT DOCUMENTS

| | | | |
|---|---|---|---|
| 5,312,674 | A | 5/1994 | Haertling et al. |
| 6,665,187 | B1 | 12/2003 | Alcoe et al. |

(Continued)

FOREIGN PATENT DOCUMENTS

| | | | |
|---|---|---|---|
| CN | 121890323 | A | 4/2026 |
| WO | WO 2010128939 | A1 | 11/2010 |
| WO | 2025/061368 | A1 | 3/2025 |

OTHER PUBLICATIONS

International Searching Authority, "Invitation to Pay Additional Fees and, where applicable, Protest fee," Patent Cooperation Treaty, Nov. 7, 2024, 15 pages, International Application No. PCT/EP2024/072447.

(Continued)

*Primary Examiner* — James Wu

(74) *Attorney, Agent, or Firm* — Tihon Poltavets, Esq.; Kevin P. Radigan, Esq.; Heslin Rothenberg Farley & Mesiti P.C.

(57) ABSTRACT

Tamper-detect assemblies and methods of fabrication are provided. A tamper-detect assembly includes a laminate carrier with embedded tamper-detect circuitry within the laminate carrier, and one or more electronic components on the laminate carrier. Further, the tamper-detect assembly includes a heat sink cover. The heat sink cover includes a heat sink and tamper-detect circuitry integrated within the heat sink cover. The heat sink cover is mounted to the laminate carrier and encloses the one or more electronic components between the laminate carrier and the heat sink cover. Together, the embedded tamper-detect circuitry of the laminate carrier and the integrated tamper-detect circuitry of (Continued)

the heat sink cover define, at least in part, a secure volume about the one or more electronic components.

23 Claims, 16 Drawing Sheets

(56) References Cited

U.S. PATENT DOCUMENTS

| | | | | |
|---|---|---|---|---|
| 7,284,992 | B2 | 10/2007 | Becker et al. | |
| 7,472,836 | B2 | 1/2009 | Farooq et al. | |
| 7,703,201 | B2 | 4/2010 | Oggioni et al. | |
| 7,710,286 | B1 * | 5/2010 | Thornley | G06F 21/86<br>340/657 |
| 7,923,830 | B2 | 4/2011 | Pope et al. | |
| 8,683,682 | B2 | 4/2014 | Schulz-Harder | |
| 9,066,447 | B2 | 6/2015 | Klum et al. | |
| 9,265,176 | B2 | 2/2016 | Arvelo et al. | |
| 9,560,737 | B2 | 1/2017 | Isaacs et al. | |
| 9,642,247 | B2 | 5/2017 | Schmidt et al. | |
| 9,911,012 | B2 * | 3/2018 | Brodsky | H01L 23/576 |
| 9,916,744 | B2 | 3/2018 | Busby et al. | |
| 10,017,292 | B1 | 7/2018 | Anderson et al. | |
| 10,143,090 | B2 | 11/2018 | Brodsky et al. | |
| 10,426,037 | B2 * | 9/2019 | Dragone | H05K 3/0014 |
| 11,191,155 | B1 * | 11/2021 | Zhang | H05K 3/30 |
| 2019/0313526 | A1 | 10/2019 | Busby et al. | |
| 2022/0192011 | A1 * | 6/2022 | Zhang | H05K 3/4647 |
| 2023/0052484 | A1 | 2/2023 | Flitsch et al. | |
| 2023/0052840 | A1 | 2/2023 | Higby et al. | |
| 2023/0068967 | A1 | 3/2023 | Werner et al. | |
| 2023/0130104 | A1 | 4/2023 | Iruvanti et al. | |

OTHER PUBLICATIONS

International Searching Authority, "Notification of Transmittal of the International Search Report and the Written Opinion of the International Searching Authority, or Declaration," Patent Cooperation Treaty, Jan. 9, 2025, 21 pages, International Application No. PCT/EP2024/072447.

* cited by examiner

TAMPER-DETECT ASSEMBLIES INCLUDING HEAT SINK COVERS WITH INTEGRATED TAMPER-DETECT CIRCUITRY

BACKGROUND

The present disclosure relates in general to the field of electronics, and more particularly, to tamper-detect electronic packaging.

As an example, many activities require secure electronic communications. To facilitate secure electronic communications, an encryption/decryption system can be implemented on an electronic assembly or circuit board assembly that is included in equipment connected to a communications network. Such an electronic assembly is an enticing target for malefactors since it may contain codes or keys to decrypt intercepted messages, or to encode fraudulent messages. To prevent this, the electronic assembly can be mounted in an enclosure, which is then wrapped in a security sensor and encapsulated with polyurethane resin. The security sensor can be, in one or more embodiments, a web or sheet of insulating material with circuit elements, such as closely-spaced, conductive lines fabricated on it. The circuit elements are disrupted if the sensor is torn during a tamper event, with the disruption being sensed by a monitor circuit to reveal the attack on the integrity of the assembly, triggering, for instance, an erasure by the monitor circuit of encryption/decryption keys stored within the electronic assembly.

SUMMARY

Certain shortcomings of the prior art are overcome, and additional advantages are provided herein through the provision, in one or more aspects, of a tamper-detect assembly which includes a laminate carrier with embedded tamper-detect circuitry within the laminate carrier, and one or more electronic components on the laminate carrier. In addition, the tamper-detect assembly includes a heat sink cover. The heat sink cover includes a heat sink and tamper-detect circuitry integrated within the heat sink cover. The heat sink cover is mounted to the laminate carrier and encloses the one or more electronic components between the laminate carrier and the heat sink cover. Together the embedded tamper-detect circuitry of the laminate carrier and the integrated tamper-detect circuitry of the heat sink cover define, at least in part, a secure volume about the one or more electronic components. Advantageously, the tamper-detect assembly includes tamper-detect features which are embedded within the laminate carrier and features which are integrated within the heat sink cover to facilitate detecting an attempted tamper event into the secure volume of the tamper-detect assembly. In addition, the heat sink cover, including the heat sink and tamper-detect circuitry integrated within the heat sink cover, provides significant thermal improvement over prior tamper-detect assemblies by providing a direct-cooling solution integrated as part of the tamper-detect assembly.

In an embodiment, the tamper-detect circuitry integrated within the heat sink cover is direct-bonded to the heat sink. By direct-bonding the tamper-detect circuitry within the heat sink cover to the heat sink, better thermal transfer is obtained, for instance, by eliminating need for an adhesive or thermal interface material between the tamper-detect circuitry and the heat sink.

In another embodiment, the tamper-detect circuitry integrated within the heat sink cover includes multiple direct-bonded tamper-detect circuit layers, where the multiple direct-bonded tamper-detect circuit layers are direct-bonded to each other and to the heat sink, and include multiple dielectric and conductive layers. Integrating tamper-detect circuitry into the heat sink cover that is direct-bonded to the heat sink advantageously improves thermal transfer to the heat sink.

In a further embodiment, the multiple dielectric and conductor layers include multiple ceramic and copper layers, and the heat sink includes copper. Advantageously, by fabricating the tamper-detect circuitry as multiple direct-bonded ceramic and copper layers, enhanced heat transfer is provided across the tamper-detect circuitry to the heat sink. For instance, with tamper-detect circuitry formed of multiple ceramic and copper layers, which are direct-bonded together, the need for dedicated heat transfer structures through the tamper-detect circuitry is avoided.

In an embodiment, the heat sink cover includes a thermally conductive base, and the multiple direct-bonded tamper-detect circuit layers are disposed, at least in part, between the heat sink and the thermally conductive base of the heat sink cover. In operation, the thermally conductive base of the heat sink cover functions as a heat spreader to facilitate transfer of heat from the one or more electronic components on the laminate carrier to the heat sink of the heat sink cover through the tamper-detect circuitry integrated within the heat sink cover.

In one or more embodiments, the tamper-detect assembly is a single multi-chip module package, and the one or more electronic components include one or more semiconductor die, and the laminate carrier includes an electrical contact array on one side of the laminate carrier for electrically coupling the single multi-chip module package to a circuit board. By implementing the tamper-detect assembly as a single multi-chip module package, the size of the tamper-detect assembly is reduced and the tamper-detect circuitry is smaller within the single multi-chip module package. For instance, the one or more semiconductor die are smaller than packaged electronic components, which facilitates establishing the secure volume about a smaller footprint.

In an embodiment, the heat sink cover is mounted to the laminate carrier at a peripheral interface of the heat sink cover and laminate carrier, and the tamper-detect circuitry integrated within the heat sink cover is electrically connected to the embedded tamper-detect circuitry within the laminate carrier at the peripheral interface of the heat sink cover and laminate carrier via an interface security layer. By electrically connecting the tamper-detect circuitry integrated within the heat sink cover to the embedded tamper-detect circuitry within the laminate carrier at the peripheral interface of the heat sink cover and laminate carrier, a simplified interconnection of the tamper-detect circuitry to a monitor component or circuit within the secure volume is obtained. For instance, the integrated tamper-detect circuitry of the heat sink cover can be operatively coupled to the monitor component or circuit through the interface security layer and embedded tamper-detect circuitry within the laminate carrier, which itself is operatively coupled to the monitor component or circuit.

In another embodiment, the heat sink cover includes a heat sink cover sidewall with an edge mounted to the laminate carrier at the peripheral interface of the heat sink cover and laminate carrier, where the tamper-detect circuitry integrated within the heat sink cover is, at least in part, embedded within the heat sink cover sidewall. Advantageously, by embedding the tamper-detect circuitry integrated within the heat sink cover within the heat sink cover sidewall, 360° tamper-detect protection is provided about the secure volume defined between the heat sink cover and the laminate carrier. Further, the heat sink cover sidewall facilitates, in one embodiment, providing clearance between the heat sink cover and the laminate carrier to accommodate the one or more electronic components on the laminate carrier within the secure volume.

In an embodiment, the laminate carrier includes a laminate carrier sidewall, the heat sink cover is mounted to an end of the laminate carrier sidewall, and the embedded tamper-detect circuitry within the laminate carrier is, at least in part, embedded within the laminate carrier sidewall. Advantageously, by providing the laminate carrier with a laminate carrier sidewall and embedding, at least in part, the embedded tamper-detect circuitry within the laminate carrier sidewall, 360° tamper-detect protection is provided about the secure volume formed between the laminate carrier and the heat sink cover. In addition, the laminate carrier sidewall facilitates providing clearance space to accommodate the one or more electronic components between the laminate carrier and heat sink cover of the tamper-detect assembly.

In another embodiment, the heat sink is selected from the group consisting of a coolant-cooled heat sink, an air-cooled heat sink, and an air-cooled heat sink with an integrated heat pipe. Advantageously, the heat sink of the heat sink cover provides direct-cooling to the tamper-detect assembly, and in particular, to the one or more electronic components within the secure volume of the tamper-detect assembly. In this manner, thermal transfer to the heat sink is enhanced over conventional tamper-detect assembly approaches, where a separate heat sink is thermally coupled via a thermal interface material to a cover or enclosure of the assembly.

In another aspect, a tamper-detect assembly is provided which includes a laminate carrier with embedded tamper-detect circuitry within the laminate carrier, and one or more electronic components on the laminate carrier. Further, the tamper-detect assembly includes a heat sink cover with tamper-detect circuitry integrated within the heat sink cover. The heat sink cover is mounted to the laminate carrier and encloses the one or more electronic components between the laminate carrier and the heat sink cover. Together, the embedded tamper-detect circuitry of the laminate carrier and the integrated tamper-detect circuitry of the heat sink cover define, at least in part, a secure volume about the one or more electronic components. The heat sink cover includes a heat sink, a thermally conductive base, and the integrated tamper-detect circuitry of the heat sink cover, with tamper-detect circuitry integrated within the heat sink cover being disposed, at least in part, between and directed-bonded to the heat sink and to the thermally conductive base of the heat sink cover. Advantageously, the tamper-detect assembly includes tamper-detect features which are embedded within the laminate carrier, and features which are integrated within the heat sink cover to facilitate detecting an attempted tamper event into the secure volume of the tamper-detect assembly. In addition, the heat sink cover, including the heat sink and the tamper-detect circuitry integrated within the heat sink cover, provides significant thermal improvement over prior tamper-detect assemblies by providing a direct-cooling solution integrated as part of the tamper-detect assembly. In operation, the thermally conductive base of the heat sink cover functions as a heat spreader to facilitate transfer of heat from the one or more electronic components on the laminate carrier to the heat sink of the heat sink cover through the tamper-detect circuitry integrated within the heat sink cover. Further, direct-bonding of the integrated tamper-detect circuitry of the heat sink cover to both the heat sink and to the thermally conductive base of the heat sink cover, provides better thermal transfer through the heat sink cover by, for instance, eliminating need for an adhesive or thermal interface material between the tamper-detect circuitry and the heat sink or the thermally conductive base.

In an embodiment, the tamper-detect circuitry integrated within the heat sink cover includes multiple direct-bonded tamper-detect circuit layers, where the multiple direct-bonded tamper-detect circuit layers include multiple dielectric and conductor layers. Integrating tamper-detect circuitry into the heat sink cover that includes multiple direct-bonded tamper-detect circuit layers advantageously improves thermal transfer within the heat sink cover to the heat sink.

In another embodiment, the multiple dielectric and conductor layers of the tamper-detect circuitry include multiple ceramic and copper layers, where the heat sink also includes copper. Advantageously, by fabricating the tamper-detect circuitry as multiple direct-bonded ceramic and copper layers, enhanced heat transfer is provided across the tamper-detect circuitry to the heat sink. For instance, with tamper-detect circuitry formed of multiple ceramic and copper layers, which are direct-bonded together, and direct-bonded to the heat sink, the need for dedicated heat transfer structures through the tamper-detect circuitry is avoided.

In an embodiment, the tamper-detect assembly is a single multi-chip module package, the one or more electronic components include one or more semiconductor die, and the laminate carrier includes an electrical contact array on one side of the laminate carrier for electrically coupling the single multi-chip module package to a circuit board. By implementing the tamper-detect assembly as a single multi-chip module package, the size of the tamper-detect assembly is reduced and the tamper-detect circuitry is smaller within the single multi-chip module package. For instance, the one or more semiconductor die are smaller than packaged electronic components, which facilitates establishing the secure volume about a smaller footprint.

In another embodiment, the heat sink cover is mounted to the laminate carrier at a peripheral interface of the heat sink cover and laminate carrier, and the tamper-detect circuitry integrated within the heat sink cover is electrically connected to the embedded tamper-detect circuitry within the laminate carrier at the peripheral interface of the heat sink cover and laminate carrier via an interface security layer. By electrically connecting the tamper-detect circuitry integrated within the heat sink cover to the embedded tamper-detect circuitry within the laminate carrier at the peripheral interface of the heat sink cover and laminate carrier, a simplified interconnection of the tamper-detect circuitry to a monitor component or circuit within the secure volume is obtained. For instance, the integrated tamper-detect circuitry of the heat sink cover can be operatively coupled to the monitor component or circuit through the interface security layer and embedded tamper-detect circuitry within the laminate carrier, which itself is operatively coupled to the monitor component or circuit.

In an embodiment, the heat sink cover includes a heat sink cover sidewall with an edge mounted to the laminate carrier at the peripheral interface of the heat sink cover and laminate carrier, and the tamper-detect circuitry integrated within the heat sink cover is, at least in part, embedded within the heat sink cover sidewall. Advantageously, by embedding the tamper-detect circuitry integrated within the heat sink cover within the heat sink cover sidewall, 360° tamper-detect protection is provided about the secure volume defined between the heat sink cover and the laminate carrier. Further, the heat sink cover sidewall facilitates, in one embodiment, providing clearance between the heat sink cover and the laminate carrier to accommodate the one or more electronic components on the laminate carrier within the secure volume.

In another embodiment, the laminate carrier includes a laminate carrier sidewall, the heat sink cover is mounted to an end of the laminate carrier sidewall, and the embedded tamper-detect circuitry within the laminate carrier is, at least in part, embedded within the laminate carrier sidewall. Advantageously, by providing the laminate carrier with a laminate carrier sidewall and embedding, at least in part, the embedded tamper-detect circuitry within the laminate carrier sidewall, 360° tamper-detect protection is provided about the secure volume formed between the laminate carrier and the heat sink cover. In addition, the laminate carrier sidewall facilitates providing clearance space to accommodate the one or more electronic components between the laminate carrier and the heat sink cover of the tamper-detect assembly.

In an embodiment, the heat sink is selected from the group consisting of a coolant-cooled heat sink, an air-cooled heat sink, and an air-cooled heat sink with an integrated heat pipe. Advantageously, the heat sink of the heat sink cover provides direct-cooling to the tamper-detect assembly, and in particular, to the one or more electronic components within the secure volume of the tamper-detect assembly. In this manner, thermal transfer to the heat sink is enhanced over conventional tamper-detect assembly approaches, where a separate heat sink is thermally coupled via thermal interface material to a cover or enclosure of the assembly.

In a further aspect, a method of fabricating a tamper-detect assembly is provided which includes forming a laminate carrier with embedded tamper-detect circuitry within the laminate carrier, and providing one or more electronic components on the laminate carrier. In addition, the method includes providing a heat sink cover including a heat sink and tamper-detect circuitry integrated within the heat sink cover. Further, the method includes mounting the heat sink cover to the laminate carrier to enclose the one or more electronic components between the laminate carrier and the heat sink cover. Together, the embedded tamper-detect circuitry of the laminate carrier and the integrated tamper-detect circuitry of the heat sink cover define, at least in part, a secure volume about the one or more electronic components. Advantageously, the tamper-detect assembly includes tamper-detect features which are embedded within the laminate carrier and features which are integrated within the heat sink cover to facilitate detecting an attempted tamper event into the secure volume of the tamper-detect assembly. In addition, the heat sink cover, including the heat sink and tamper-detect circuitry integrated within the heat sink cover, provides significant thermal improvement over prior tamper-detect assemblies by providing a direct-cooling solution integrated as part of the tamper-detect assembly.

In an embodiment, providing the heat sink cover includes direct-bonding the tamper-detect circuitry to the heat sink. By direct-bonding the tamper-detect circuitry within the heat sink cover to the heat sink, better thermal transfer is obtained, for instance, by eliminating need for an adhesive or thermal interface material between the tamper-detect circuitry and the heat sink.

In another embodiment, the tamper-detect circuitry integrated within the heat sink cover includes multiple tamper-detect circuit layers, the multiple tamper-detect circuit layers comprising multiple dielectric and conductor layers, and providing the heat sink cover further includes direct-bonding the multiple dielectric and conductor layers together, and to the heat sink cover. By direct-bonding the multiple dielectric and conductor layers of the tamper-detect circuitry together, improved thermal transfer is provided through the heat sink cover to the heat sink.

In an embodiment, the multiple dielectric and conductor layers include multiple ceramic and copper layers, and the heat sink includes copper. Advantageously, by fabricating the tamper-detect circuitry as multiple direct-bonded ceramic and copper layers, enhanced heat transfer is provided across the tamper-detect circuitry to the heat sink. For instance, with tamper-detect circuitry formed of multiple ceramic and copper layers, which are direct-bonded together, the need for dedicated heat transfer structures through the tamper-detect circuitry is avoided.

In another embodiment, the heat sink cover further includes a thermally conductive base, and providing the heat sink cover includes positioning the multiple tamper-detect circuit layers, at least in part, between the heat sink and the thermally conductive base, and direct-bonding the multiple tamper-detect circuit layers to the heat sink and to the thermally conductive base of the heat sink cover. In operation, the thermally conductive base of the heat sink cover functions as a heat spreader to facilitate transfer of heat from the one or more electronic components on the laminate carrier to the heat sink of the heat sink cover through the tamper-detect circuitry integrated within the heat sink cover. Further, direct-bonding the multiple tamper-detect circuit layers to the heat sink and to the thermally conductive base of the heat sink cover advantageously improves thermal transfer through the heat sink cover by, for instance, eliminating need for an adhesive or thermal interface material between the tamper-detect circuitry and the heat sink or thermally conductive base.

In an embodiment, the tamper-detect assembly is a single multi-chip module package, the one or more electronic components include one or more semiconductor die, and the laminate carrier includes an electrical contact array on one side of the laminate carrier for electrically coupling the single multi-chip module package to a circuit board. By implementing the tamper-detect assembly as a single multi-chip module package, the size of the tamper-detect assembly is reduced and the tamper-detect circuitry is smaller within the single multi-chip module package. For instance, the one or more semiconductor die are smaller than packaged electronic components, which facilitates establishing the secure volume about a smaller footprint.

In an embodiment, the heat sink is selected from the group consisting of a coolant-cooled heat sink, an air-cooled heat sink, and an air-cooled heat sink with an integrated heat pipe. Advantageously, the heat sink of the heat sink cover provides direct-cooling to the tamper-detect assembly, and in particular, to the one or more electronic components within the secure volume of the tamper-detect assembly. In this manner, thermal transfer to the heat sink is enhanced over conventional tamper-detect assembly approaches, where a separate heat sink is thermally coupled via a thermal interface material to a cover or enclosure of the assembly.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
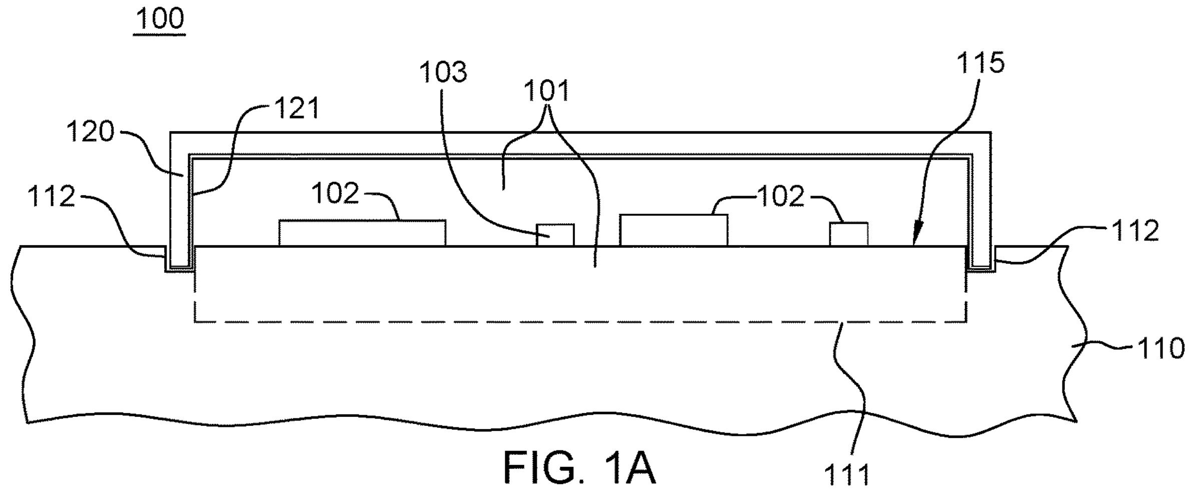
FIG. 1A is a cross-sectional elevational view of one embodiment of a tamper-proof electronic package, or tamper-detect assembly, which includes a tamper-respondent sensor with tamper-detect circuitry.

Provided herein, in one or more aspects, is a tamper-detect assembly which includes a laminate carrier with embedded tamper-detect circuitry within the laminate carrier, and one or more electronic components on the laminate carrier. In addition, the tamper-detect assembly includes a heat sink cover. The heat sink cover includes a heat sink and tamper-detect circuitry integrated within the heat sink cover. The heat sink cover is mounted to the laminate carrier and encloses the one or more electronic components between the laminate carrier and the heat sink cover. Together the embedded tamper-detect circuitry of the laminate carrier and the integrated tamper-detect circuitry of the heat sink cover define, at least in part, a secure volume about the one or more electronic components. Advantageously, the tamper-detect assembly includes tamper-detect features which are embedded within the laminate carrier and features which are integrated within the heat sink cover to facilitate detecting an attempted tamper event into the secure volume of the tamper-detect assembly. In addition, the heat sink cover, including the heat sink and tamper-detect circuitry integrated within the heat sink cover, provides significant thermal improvement over prior tamper-detect assemblies by providing a direct-cooling solution integrated as part of the tamper-detect assembly.

In an embodiment, the tamper-detect circuitry integrated within the heat sink cover is direct-bonded to the heat sink. By direct-bonding the tamper-detect circuitry within the heat sink cover to the heat sink, better thermal transfer is obtained, for instance, by eliminating need for an adhesive or thermal interface material between the tamper-detect circuitry and the heat sink.

In another embodiment, the tamper-detect circuitry integrated within the heat sink cover includes multiple direct-bonded tamper-detect circuit layers, where the multiple direct-bonded tamper-detect circuit layers are direct-bonded to each other and to the heat sink, and include multiple dielectric and conductive layers. Integrating tamper-detect circuitry into the heat sink cover that is direct-bonded to the heat sink advantageously improves thermal transfer to the heat sink.

In a further embodiment, the multiple dielectric and conductor layers include multiple ceramic and copper layers, and the heat sink includes copper. Advantageously, by fabricating the tamper-detect circuitry as multiple direct-bonded ceramic and copper layers, enhanced heat transfer is provided across the tamper-detect circuitry to the heat sink. For instance, with tamper-detect circuitry formed of multiple ceramic and copper layers, which are direct-bonded together, the need for dedicated heat transfer structures through the tamper-detect circuitry is avoided.

In an embodiment, the heat sink cover includes a thermally conductive base, and the multiple direct-bonded tamper-detect circuit layers are disposed, at least in part, between the heat sink and the thermally conductive base of the heat sink cover. In operation, the thermally conductive base of the heat sink cover functions as a heat spreader to facilitate transfer of heat from the one or more electronic components on the laminate carrier to the heat sink of the heat sink cover through the tamper-detect circuitry integrated within the heat sink cover.

In one or more embodiments, the tamper-detect assembly is a single multi-chip module package, and the one or more electronic components include one or more semiconductor die, and the laminate carrier includes an electrical contact array on one side of the laminate carrier for electrically coupling the single multi-chip module package to a circuit board. By implementing the tamper-detect assembly as a single multi-chip module package, the size of the tamper-detect assembly is reduced and the tamper-detect circuitry is smaller within the single multi-chip module package. For instance, the one or more semiconductor die are smaller than packaged electronic components, which facilitates establishing the secure volume about a smaller footprint.

In an embodiment, the heat sink cover is mounted to the laminate carrier at a peripheral interface of the heat sink cover and laminate carrier, and the tamper-detect circuitry integrated within the heat sink cover is electrically connected to the embedded tamper-detect circuitry within the laminate carrier at the peripheral interface of the heat sink cover and laminate carrier via an interface security layer. By electrically connecting the tamper-detect circuitry integrated within the heat sink cover to the embedded tamper-detect circuitry within the laminate carrier at the peripheral interface of the heat sink cover and laminate carrier, a simplified interconnection of the tamper-detect circuitry to a monitor component or circuit within the secure volume is obtained. For instance, the integrated tamper-detect circuitry of the heat sink cover can be operatively coupled to the monitor component or circuit through the interface security layer and embedded tamper-detect circuitry within the laminate carrier, which itself is operatively coupled to the monitor component or circuit.

In another embodiment, the heat sink cover includes a heat sink cover sidewall with an edge mounted to the laminate carrier at the peripheral interface of the heat sink cover and laminate carrier, where the tamper-detect circuitry integrated within the heat sink cover is, at least in part, embedded within the heat sink cover sidewall. Advantageously, by embedding the tamper-detect circuitry integrated within the heat sink cover within the heat sink cover sidewall, 360° tamper-detect protection is provided about the secure volume defined between the heat sink cover and the laminate carrier. Further, the heat sink cover sidewall facilitates, in one embodiment, providing clearance between the heat sink cover and the laminate carrier to accommodate the one or more electronic components on the laminate carrier within the secure volume.

In an embodiment, the laminate carrier includes a laminate carrier sidewall, the heat sink cover is mounted to an end of the laminate carrier sidewall, and the embedded tamper-detect circuitry within the laminate carrier is, at least in part, embedded within the laminate carrier sidewall. Advantageously, by providing the laminate carrier with a laminate carrier sidewall and embedding, at least in part, the embedded tamper-detect circuitry within the laminate carrier sidewall, 360° tamper-detect protection is provided about the secure volume formed between the laminate carrier and the heat sink cover. In addition, the laminate carrier sidewall facilitates providing clearance space to accommodate the one or more electronic components between the laminate carrier and heat sink cover of the tamper-detect assembly.

In another embodiment, the heat sink is selected from the group consisting of a coolant-cooled heat sink, an air-cooled heat sink, and an air-cooled heat sink with an integrated heat pipe. Advantageously, the heat sink of the heat sink cover provides direct-cooling to the tamper-detect assembly, and in particular, to the one or more electronic components within the secure volume of the tamper-detect assembly. In this manner, thermal transfer to the heat sink is enhanced over conventional tamper-detect assembly approaches, where a separate heat sink is thermally coupled via a thermal interface material to a cover or enclosure of the assembly.

In another aspect, a tamper-detect assembly is provided which includes a laminate carrier with embedded tamper-detect circuitry within the laminate carrier, and one or more electronic components on the laminate carrier. Further, the tamper-detect assembly includes a heat sink cover with tamper-detect circuitry integrated within the heat sink cover. The heat sink cover is mounted to the laminate carrier and encloses the one or more electronic components between the laminate carrier and the heat sink cover. Together, the embedded tamper-detect circuitry of the laminate carrier and the integrated tamper-detect circuitry of the heat sink cover define, at least in part, a secure volume about the one or more electronic components. The heat sink cover includes a heat sink, a thermally conductive base, and the integrated tamper-detect circuitry of the heat sink cover, with tamper-detect circuitry integrated within the heat sink cover being disposed, at least in part, between and directed-bonded to the heat sink and to the thermally conductive base of the heat sink cover. Advantageously, the tamper-detect assembly includes tamper-detect features which are embedded within the laminate carrier, and features which are integrated within the heat sink cover to facilitate detecting an attempted tamper event into the secure volume of the tamper-detect assembly. In addition, the heat sink cover, including the heat sink and the tamper-detect circuitry integrated within the heat sink cover, provides significant thermal improvement over prior tamper-detect assemblies by providing a direct-cooling solution integrated as part of the tamper-detect assembly. In operation, the thermally conductive base of the heat sink cover functions as a heat spreader to facilitate transfer of heat from the one or more electronic components on the laminate carrier to the heat sink of the heat sink cover through the tamper-detect circuitry integrated within the heat sink cover. Further, direct-bonding of the integrated tamper-detect circuitry of the heat sink cover to both the heat sink and to the thermally conductive base of the heat sink cover, provides better thermal transfer through the heat sink cover by, for instance, eliminating need for an adhesive or thermal interface material between the tamper-detect circuitry and the heat sink or the thermally conductive base.

In an embodiment, the tamper-detect circuitry integrated within the heat sink cover includes multiple direct-bonded tamper-detect circuit layers, where the multiple direct-bonded tamper-detect circuit layers include multiple dielectric and conductor layers. Integrating tamper-detect circuitry into the heat sink cover that includes multiple direct-bonded tamper-detect circuit layers advantageously improves thermal transfer within the heat sink cover to the heat sink.

In another embodiment, the multiple dielectric and conductor layers of the tamper-detect circuitry include multiple ceramic and copper layers, where the heat sink also includes copper. Advantageously, by fabricating the tamper-detect circuitry as multiple direct-bonded ceramic and copper layers, enhanced heat transfer is provided across the tamper-detect circuitry to the heat sink. For instance, with tamper-detect circuitry formed of multiple ceramic and copper layers, which are direct-bonded together, and direct-bonded to the heat sink, the need for dedicated heat transfer structures through the tamper-detect circuitry is avoided.

In an embodiment, the tamper-detect assembly is a single multi-chip module package, the one or more electronic components include one or more semiconductor die, and the laminate carrier includes an electrical contact array on one side of the laminate carrier for electrically coupling the single multi-chip module package to a circuit board. By implementing the tamper-detect assembly as a single multi-chip module package, the size of the tamper-detect assembly is reduced and the tamper-detect circuitry is smaller within the single multi-chip module package. For instance, the one or more semiconductor die are smaller than packaged electronic components, which facilitates establishing the secure volume about a smaller footprint.

In another embodiment, the heat sink cover is mounted to the laminate carrier at a peripheral interface of the heat sink cover and laminate carrier, and the tamper-detect circuitry integrated within the heat sink cover is electrically connected to the embedded tamper-detect circuitry within the laminate carrier at the peripheral interface of the heat sink cover and laminate carrier via an interface security layer. By electrically connecting the tamper-detect circuitry integrated within the heat sink cover to the embedded tamper-detect circuitry within the laminate carrier at the peripheral interface of the heat sink cover and laminate carrier, a simplified interconnection of the tamper-detect circuitry to a monitor component or circuit within the secure volume is obtained. For instance, the integrated tamper-detect circuitry of the heat sink cover can be operatively coupled to the monitor component or circuit through the interface security layer and embedded tamper-detect circuitry within the laminate carrier, which itself is operatively coupled to the monitor component or circuit.

In an embodiment, the heat sink cover includes a heat sink cover sidewall with an edge mounted to the laminate carrier at the peripheral interface of the heat sink cover and laminate carrier, and the tamper-detect circuitry integrated within the heat sink cover is, at least in part, embedded within the heat sink cover sidewall. Advantageously, by embedding the tamper-detect circuitry integrated within the heat sink cover within the heat sink cover sidewall, 360° tamper-detect protection is provided about the secure volume defined between the heat sink cover and the laminate carrier. Further, the heat sink cover sidewall facilitates, in one embodiment, providing clearance between the heat sink cover and the laminate carrier to accommodate the one or more electronic components on the laminate carrier within the secure volume.

In another embodiment, the laminate carrier includes a laminate carrier sidewall, the heat sink cover is mounted to an end of the laminate carrier sidewall, and the embedded tamper-detect circuitry within the laminate carrier is, at least in part, embedded within the laminate carrier sidewall. Advantageously, by providing the laminate carrier with a laminate carrier sidewall and embedding, at least in part, the embedded tamper-detect circuitry within the laminate carrier sidewall, 360° tamper-detect protection is provided about the secure volume formed between the laminate carrier and the heat sink cover. In addition, the laminate carrier sidewall facilitates providing clearance space to accommodate the one or more electronic components between the laminate carrier and the heat sink cover of the tamper-detect assembly.

In an embodiment, the heat sink is selected from the group consisting of a coolant-cooled heat sink, an air-cooled heat sink, and an air-cooled heat sink with an integrated heat pipe. Advantageously, the heat sink of the heat sink cover provides direct-cooling to the tamper-detect assembly, and in particular, to the one or more electronic components within the secure volume of the tamper-detect assembly. In this manner, thermal transfer to the heat sink is enhanced over conventional tamper-detect assembly approaches, where a separate heat sink is thermally coupled via thermal interface material to a cover or enclosure of the assembly.

In a further aspect, a method of fabricating a tamper-detect assembly is provided which includes forming a laminate carrier with embedded tamper-detect circuitry within the laminate carrier, and providing one or more electronic components on the laminate carrier. In addition, the method includes providing a heat sink cover including a heat sink and tamper-detect circuitry integrated within the heat sink cover. Further, the method includes mounting the heat sink cover to the laminate carrier to enclose the one or more electronic components between the laminate carrier and the heat sink cover. Together, the embedded tamper-detect circuitry of the laminate carrier and the integrated tamper-detect circuitry of the heat sink cover define, at least in part, a secure volume about the one or more electronic components. Advantageously, the tamper-detect assembly includes tamper-detect features which are embedded within the laminate carrier and features which are integrated within the heat sink cover to facilitate detecting an attempted tamper event into the secure volume of the tamper-detect assembly. In addition, the heat sink cover, including the heat sink and tamper-detect circuitry integrated within the heat sink cover, provides significant thermal improvement over prior tamper-detect assemblies by providing a direct-cooling solution integrated as part of the tamper-detect assembly.

In an embodiment, providing the heat sink cover includes direct-bonding the tamper-detect circuitry to the heat sink. By direct-bonding the tamper-detect circuitry within the heat sink cover to the heat sink, better thermal transfer is obtained, for instance, by eliminating need for an adhesive or thermal interface material between the tamper-detect circuitry and the heat sink.

In another embodiment, the tamper-detect circuitry integrated within the heat sink cover includes multiple tamper-detect circuit layers, the multiple tamper-detect circuit layers comprising multiple dielectric and conductor layers, and providing the heat sink cover further includes direct-bonding the multiple dielectric and conductor layers together, and to the heat sink cover. By direct-bonding the multiple dielectric and conductor layers of the tamper-detect circuitry together, improved thermal transfer is provided through the heat sink cover to the heat sink.

In an embodiment, the multiple dielectric and conductor layers include multiple ceramic and copper layers, and the heat sink includes copper. Advantageously, by fabricating the tamper-detect circuitry as multiple direct-bonded ceramic and copper layers, enhanced heat transfer is provided across the tamper-detect circuitry to the heat sink. For instance, with tamper-detect circuitry formed of multiple ceramic and copper layers, which are direct-bonded together, the need for dedicated heat transfer structures through the tamper-detect circuitry is avoided.

In another embodiment, the heat sink cover further includes a thermally conductive base, and providing the heat sink cover includes positioning the multiple tamper-detect circuit layers, at least in part, between the heat sink and the thermally conductive base, and direct-bonding the multiple tamper-detect circuit layers to the heat sink and to the thermally conductive base of the heat sink cover. In operation, the thermally conductive base of the heat sink cover functions as a heat spreader to facilitate transfer of heat from the one or more electronic components on the laminate carrier to the heat sink of the heat sink cover through the tamper-detect circuitry integrated within the heat sink cover. Further, direct-bonding the multiple tamper-detect circuit layers to the heat sink and to the thermally conductive base of the heat sink cover advantageously improves thermal transfer through the heat sink cover by, for instance, eliminating need for an adhesive or thermal interface material between the tamper-detect circuitry and the heat sink or thermally conductive base.

In an embodiment, the tamper-detect assembly is a single multi-chip module package, the one or more electronic components include one or more semiconductor die, and the laminate carrier includes an electrical contact array on one side of the laminate carrier for electrically coupling the single multi-chip module package to a circuit board. By implementing the tamper-detect assembly as a single multi-chip module package, the size of the tamper-detect assembly is reduced and the tamper-detect circuitry is smaller within the single multi-chip module package. For instance, the one or more semiconductor die are smaller than packaged electronic components, which facilitates establishing the secure volume about a smaller footprint.

In an embodiment, the heat sink is selected from the group consisting of a coolant-cooled heat sink, an air-cooled heat sink, and an air-cooled heat sink with an integrated heat pipe. Advantageously, the heat sink of the heat sink cover provides direct-cooling to the tamper-detect assembly, and in particular, to the one or more electronic components within the secure volume of the tamper-detect assembly. In this manner, thermal transfer to the heat sink is enhanced over conventional tamper-detect assembly approaches, where a separate heat sink is thermally coupled via a thermal interface material to a cover or enclosure of the assembly.

In another aspect, a tamper-detect assembly is provided which includes a laminate carrier with embedded tamper-detect circuitry within the laminate carrier, and one or more electronic components on the laminate carrier. In addition, the tamper-detect assembly includes a heat sink cover. The heat sink cover includes a heat sink and tamper-detect circuitry integrated within the heat sink cover. The heat sink cover is mounted to the laminate carrier and encloses the one or more electronic components between the laminate carrier and the heat sink cover. Together, the embedded tamper-detect circuitry of the laminate carrier and the integrated tamper-detect circuitry of the heat sink cover define, at least in part, a secure volume about the one or more electronic components. Further, the tamper-detect assembly is a single multi-chip module package, and the one or more electronic components include one or more semiconductor die, and the laminate carrier includes an electrical contact array on one side of the laminate carrier for electrically coupling the single multi-chip module package to a circuit board. Advantageously, the tamper-detect assembly includes tamper-detect features which are embedded within the laminate carrier and features which are integrated within the heat sink cover to facilitate detecting an attempted tamper event into the secure volume of the tamper-detect assembly. In addition, the heat sink cover, including the heat sink and tamper-detect circuitry integrated within the heat sink cover, provide significant thermal improvement over prior tamper-detect assemblies by providing a direct-cooling solution integrated as part of the tamper-detect assembly. By implementing the tamper-detect assembly as a single multi-chip module package, the size of the tamper-detect assembly is reduced and the tamper-detect circuitry is smaller within the single multi-chip module package. For instance, the one or more semiconductor die are smaller than packaged electronic components, which facilitates establishing the secure volume upon a smaller footprint.

In an embodiment, the tamper-detect circuitry integrated within the heat sink cover is direct-bonded to the heat sink. By direct-bonding the tamper-detect circuitry within the heat sink cover to the heat sink, better thermal transfer is obtained, for instance, by eliminating need for an adhesive or thermal interface material between the tamper-detect circuitry and the heat sink.

In another embodiment, the tamper-detect circuitry integrated within the heat sink cover includes multiple direct-bonded tamper-detect circuit layers, where the multiple direct-bonded tamper-detect circuit layers are direct-bonded to each other and to the heat sink, and include multiple dielectric and conductive layers. Integrating tamper-detect circuitry into the heat sink cover that is direct-bonded to the heat sink advantageously improves thermal transfer to the heat sink.

In a further embodiment, the multiple dielectric and conductor layers include multiple ceramic and copper layers, and the heat sink includes copper. Advantageously, by fabricating the tamper-detect circuitry as multiple direct-bonded ceramic and copper layers, enhanced heat transfer is provided across the tamper-detect circuitry to the heat sink. For instance, with tamper-detect circuitry formed of multiple ceramic and copper layers, which are direct-bonded together, the need for dedicated heat transfer structures through the tamper-detect circuitry is avoided.

In an embodiment, the heat sink cover includes a thermally conductive base, and the multiple direct-bonded tamper-detect circuit layers are disposed, at least in part, between the heat sink and the thermally conductive base of the heat sink cover. In operation, the thermally conductive base of the heat sink cover functions as a heat spreader to facilitate transfer of heat from the one or more electronic components on the laminate carrier to the heat sink of the heat sink cover through the tamper-detect circuitry integrated within the heat sink cover.

Aspects of the present disclosure and certain features, advantages, and details thereof, are explained more fully below with reference to the non-limiting example(s) illustrated in the accompanying drawings. Descriptions of well-known materials, fabrication tools, processing techniques, etc., are omitted so as not to unnecessarily obscure the disclosure in detail. It should be understood, however, that the detailed description and the specific example(s), while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application of the concepts disclosed.

Disclosed herein are certain novel tamper-detect assemblies and methods of fabricating tamper-detect assemblies to, for instance, facilitate enabling tamper detection and monitoring to prevent access to one or more sensitive electronic components. In one or more implementations, various tamper-detect assemblies and methods of fabrication are disclosed which provide, for instance, a security Level 4 secure volume for accommodating one or more electronic components, such as one or more encryption and/or decryption modules and associated components of, for instance, a communications card or other electronic assembly to be protected, while also providing cooling of the one or more electronic components within the secure volume.

Figure 1B:
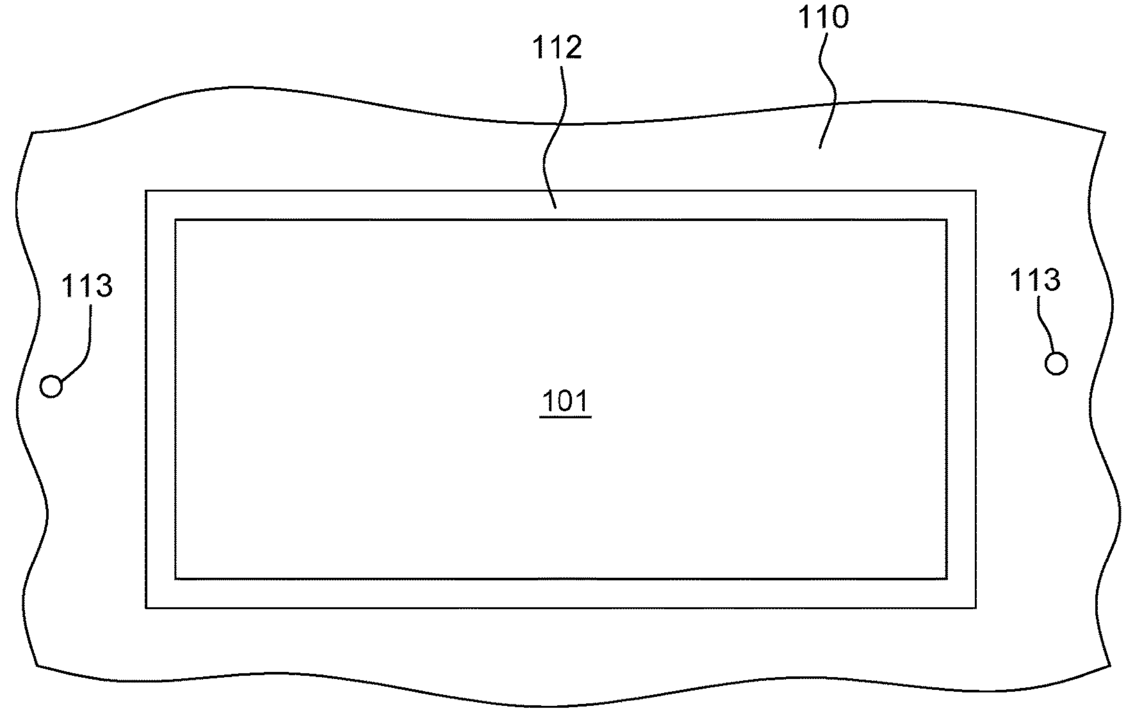
FIG. 1B is a top plan view of the multilayer circuit board of FIG. 1A.

Referring to FIGS. 1A & 1B, one embodiment of a tamper-proof electronic package or tamper-detect assembly 100 is depicted, which includes one or more electronic components, such as a circuit 115 and/or electronic devices (or elements) 102 coupled to a multilayer circuit board 110.

Referring collectively to FIGS. 1A & 1B, circuit 115 resides on or is embedded within multilayer circuit board 110, which also has an embedded tamper-respondent sensor 111 that facilitates defining, in part, a secure volume 101 associated with multilayer circuit board 110 that (in one or more embodiments) extends into multilayer circuit board 110. In particular, in the embodiment of FIGS. 1A & 1B, secure volume 101 can exist partially within multilayer circuit board 110, and partially above multilayer circuit board 110. One or more electronic devices 102 are mounted to multilayer circuit board 110 within secure volume 101 and can include, for instance, one or more encryption modules and/or decryption modules, and/or associated components, to be protected within the tamper-proof electronic package. In one or more implementations, the one or more electronic components to be protected can include, for instance, components of a secure communications card of a computer system.

Tamper-proof electronic package 100 further includes an enclosure 120 or cover, such as a five-sided or pedestal-type enclosure, mounted to multilayer circuit board 110 within, for instance, a continuous groove (or trench) 112 formed within an upper surface of multilayer circuit board 110, and secured to the multilayer circuit board 110 via, for instance, a structural adhesive disposed within continuous groove 112. In one or more embodiments, enclosure 120 can be made of a thermally conductive material for facilitating cooling of the one or more electronic components 102 within the secure volume. A security mesh or tamper-respondent sensor 121 can be associated with enclosure 120, for example, on the inner surface of enclosure 120, to facilitate defining, in combination with tamper-respondent sensor 111 embedded within multilayer circuit board 110, secure volume 101. In one or more other implementations, enclosure 120 can be securely affixed to a surface of multilayer circuit board 110 (without a continuous groove) using, for instance, a bonding material such as an epoxy or other adhesive.

Briefly described, tamper-respondent sensor 121 can include, in one or more examples, one or more tamper-detection layers which include circuit lines or traces provided on one or both sides of, or within, a structural layer, which in one or more implementations, can be an insulating layer or film. The circuit lines can be of a line width and have a pitch or line-to-line spacing such that piercing of the layer at any point results in damage to one or more of the circuit lines or traces. In one or more implementations, the circuit lines can define one or more conductors which can be electrically connected in a network to a monitor circuit or detector 103, which monitors, for instance, resistance on the lines. Detection of a change in resistance caused by cutting or damaging one or more of the lines, will cause information within the secure volume to be automatically erased. The conductive lines of the tamper-respondent sensor can be in any desired pattern, such as a sinusoidal pattern or a random pattern (as described further below), to make it more difficult to breach the tamper-detection layer without detection.

For resistive monitoring, a variety of materials can be employed to form the circuit lines. For instance, the circuit lines can be formed of a metal or metal alloy, such as copper, or silver, or can be formed, for example, of an intrinsically-conductive polymer, carbon ink, or nickel phosphorous (NiP), or Omega-ply®, offered by Omega Technologies, Inc., of Culver City, California (USA), or Ticer™, offered by Ticer Technologies, Chandler, Arizona (USA). The process employed to form the fine circuit lines or traces is dependent, in part, on the choice of materials used for the circuit lines. For instance, if copper circuit lines are fabricated, then additive processing, such as plating of copper traces, or subtractive processing, such as etching away unwanted copper between trace lines, can be employed. In certain other embodiments, 3-D printing can be used to form the traces of the tamper-respondent sensor.

As noted, in one or more implementations, the circuit lines or traces of the tamper-respondent sensor(s) can line the inner surface(s) of enclosure 120, and can be connected to define one or more security circuits or networks.

As depicted in FIG. 1B, one or more external circuit connection vias 113 can be provided within multilayer circuit board 110 for electrically connecting to the one or more electronic components within secure volume 101. These one or more external circuit connection vias 113 can electrically connect to one or more external signal lines or planes (not shown) embedded within multilayer circuit board 110 and extending, for instance, into a secure base region of (or below) secure volume 101. Electrical connections to and from secure volume 101 can be provided by coupling to such external signal lines or planes within the multilayer circuit board 110.

As noted, secure volume 101 can be sized to house one or more electronic components to be protected and can be constructed to extend into multilayer circuit board 110. In one or more implementations, multilayer circuit board 110 includes electrical interconnect within the secure volume 101 defined in the board, for instance, for electrically connecting one or more tamper-detection or security circuit layers of the embedded tamper-respondent sensor 111 to associated monitor circuitry also disposed within secure volume 101, along with, for instance, one or more daughter cards, such as memory DIMMs, PCIe cards, processor cards, etc.

Note that the packaging embodiment depicted in FIGS. 1A & 1B is presented by way of example only. Other configurations of enclosure 120, or multilayer circuit board 110 can be employed, and/or other approaches to coupling enclosure 120 and multilayer circuit board 110 can be used. For instance, in one or more alternate implementations, enclosure 120 can be securely affixed to an upper surface of multilayer circuit board 110 (without a continuous groove) using, for instance, a structural bonding material such as an epoxy or other adhesive.

Figure 2:
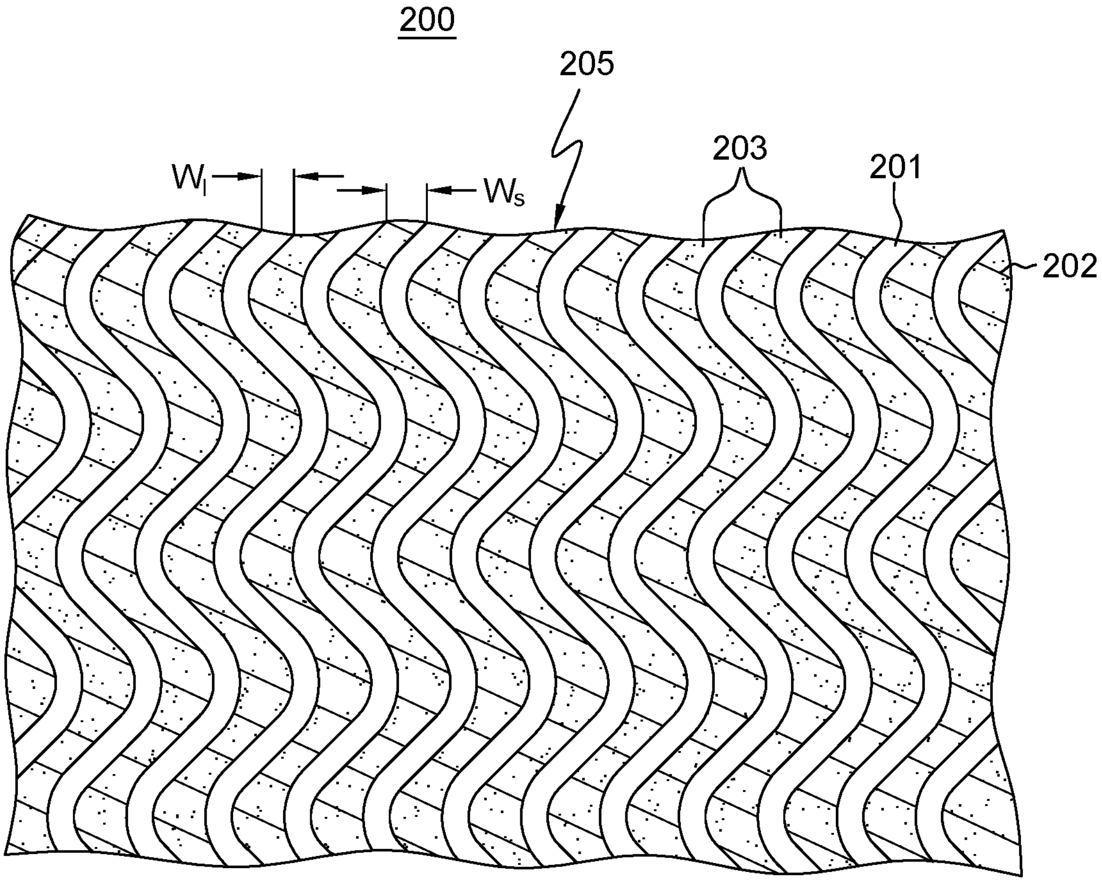
FIG. 2 depicts one embodiment of a tamper-respondent sensor with conductive lines forming, in part, at least one security circuit, or tamper-detect circuit, of a tamper-detect assembly.

By way of example, FIG. 2 depicts a portion of one embodiment of a tamper-detection layer 205 (or laser and pierce-respondent layer) of a tamper-respondent sensor 200 or security sensor for use, for instance, as tamper-respondent sensor 121 on the inner surface of an enclosure such as depicted in FIGS. 1A-1B. In the FIG. 2 embodiment, tamper-detection layer 205 includes tamper-detect circuit lines or traces 201 provided on one or both opposite sides of a layer, such as a flexible layer 202, which in one or more embodiments, can be a flexible insulating layer or film.

FIG. 2 illustrates circuit lines 201 on, for instance, one side of flexible layer 202, with the traces on the opposite side of the film being, for instance, the same pattern, but (in one or more embodiments) offset to lie directly below spaces 203, between circuit lines 201. The circuit lines on one side of the flexible layer can be of a line width $W_1$ and have a pitch or line-to-line spacing $W_s$ such that piercing of the layer 205 at any point results in damage to at least one of the circuit lines traces 201. In one or more implementations, the circuit lines can be electrically connected in-series or parallel to define one or more conductors which can be electrically connected in a network to a monitor circuit, which can, in one or more implementations, monitor the resistance of the lines. In one embodiment, detection of an increase, or other change, in resistance, caused by cutting or damaging one of the traces, can cause information within the encryption and/or decryption module to be erased. Providing conductive lines 201 in a pattern, such as a sinusoidal pattern, can make it more difficult to breach tamper-detection layer 205 without detection. Note, in this regard, that conductive lines 201 can be provided in any desired pattern. For instance, in an alternate implementation, conductive lines 201 can be provided as parallel, straight conductive lines, if desired, and the pattern or orientation of the pattern can vary between sides of a layer, and/or between layers.

As intrusion technology continues to evolve, anti-intrusion technology needs to continue to improve to stay ahead. In one or more implementations, the tamper-respondent sensor can cover or line an inner surface of an enclosure to provide a secure volume about at least one electronic component to be protected. Further, the tamper-respondent sensor, or more particularly, the security circuit(s) of the sensor, can be embedded within a multilayer circuit board or laminate carrier, such as described below.

Note that a variety of materials can advantageously be employed to form the circuit lines. For instance, the circuit lines can be formed of a conductive ink (such as a carbon-loaded conductive ink) printed onto or into one or more of the layers in a stack of layers of the sensor. Alternatively, a metal or metal alloy can be used to form the circuit lines, such as copper, silver, intrinsically conductive polymers, carbon ink, or nickel-phosphorus (NiP), such as Omega-Ply®, offered by Omega Technologies, Inc. of Culver City, California (USA), or nickel-chrome, such as Ticer™ offered by Ticer Technologies, Chandler, Arizona (USA). Note that the process employed to form the fine circuit lines or traces on the order described herein can be dependent, in part, on the choice of material used for the circuit lines. For instance, if copper circuit lines are being fabricated, then additive processing, such as plating up copper traces, or subtractive processing, such as etching away unwanted copper between trace lines, can be employed.

Figure 3:
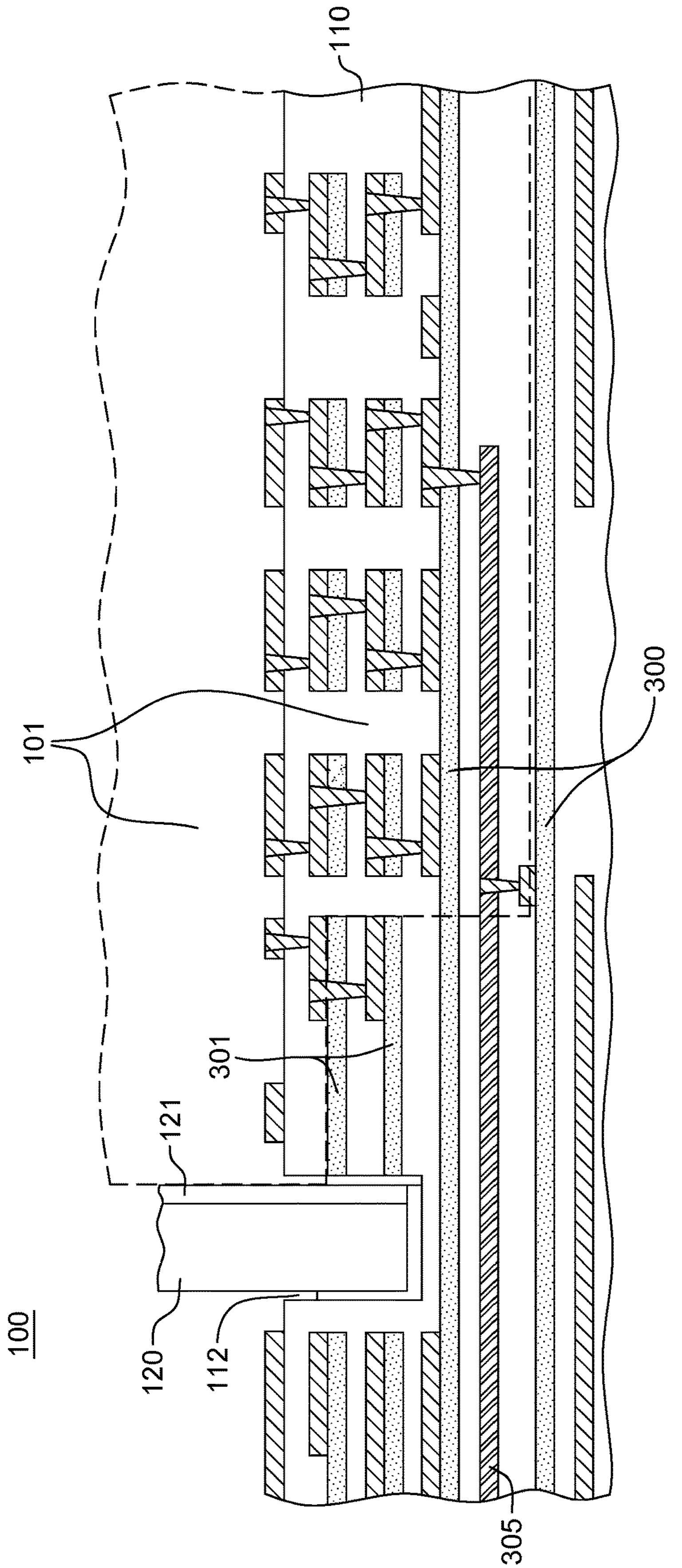
FIG. 3 is a partial cross-sectional elevational view of a more detailed embodiment of a tamper-detect assembly.

By way of further example, FIG. 3 depicts a partial cross-sectional elevational view of a more detailed embodiment of tamper-proof electronic package 100, and in particular, of multilayer circuit board 110, to which enclosure 120 is secured. In this configuration, the embedded tamper-respondent sensor includes multiple tamper-detection layers including, by way of example, at least one tamper-detection mat (or base) layer 300, and at least one tamper-detection frame 301. In the example depicted, two tamper-detection mat layers 300 and two tamper-detection frames 301 are illustrated, by way of example only. The lower-most tamper-detection mat layer 300 can be a continuous sense or detect layer extending completely below the secure volume being defined within and/or above multilayer circuit board 110. One or both tamper-detection mat layers 300 below secure volume 101 can be partitioned into multiple circuit zones, if desired. Within each tamper-detection mat layer, or more particularly, within each circuit zone of each tamper-detection mat layer, multiple circuits or conductive traces can be provided in any desired configuration. Further, the conductive traces within the tamper-detection layers can be implemented as, for instance, a resistive layer.

As illustrated, one or more external signal lines or planes 305 can enter secure volume 101 between, in one embodiment, two tamper-detection mat layers 300, and then electrically connect upwards into the secure volume 101 through one or more conductive vias, arranged in any desired location and pattern. In the configuration depicted, the one or more tamper-detection frames 301 are disposed at least inside of the area defined by continuous groove 112 accommodating the base of enclosure 120. Together with the tamper-respondent sensor(s) 121 associated with enclosure 120, tamper-detection frames 301, and tamper-detection mat layers 300, define secure volume 101, which can extend, in part, into multilayer circuit board 110. With secure volume 101 defined, in part, within multilayer circuit board 110, the external signal line(s) 305 can be securely electrically connected to, for instance, the one or more electronic components mounted to, or of, multilayer circuit board 110 within secure volume 101. In addition, secure volume 101 can accommodate electrical interconnection of the conductive traces of the multiple tamper-detection layers 300, 301, for instance, via appropriate monitor circuitry.

Added security can be provided by extending tamper-detection mat layers 300 (and if desired, tamper-detection frames 301) outward past the periphery of enclosure 120. In this manner, a line of attack can be made more difficult at the interface between enclosure 120 and multilayer circuit board 110 since the attack would need to clear, for instance, tamper-detection mat layers 300, the enclosure 120, as well as the tamper-detection frames 301 of the embedded tamper-detect circuit.

Numerous variations on multilayer circuit board 110 of FIGS. 1A-1B & 3 are possible. For instance, in one embodiment, the embedded tamper-detect circuit can include one or more tamper-detection mat layers 300 and one or more tamper-detection frames 301, such as described above, and a tri-plate structure comprising one or more external signal lines or layers sandwiched between an upper ground plane and a lower ground plane. In this configuration, high-speed transfer of signals to and from the secure volume, and in particular, to and from the one or more electronic components resident within the secure volume, can be facilitated.

Figure 4:
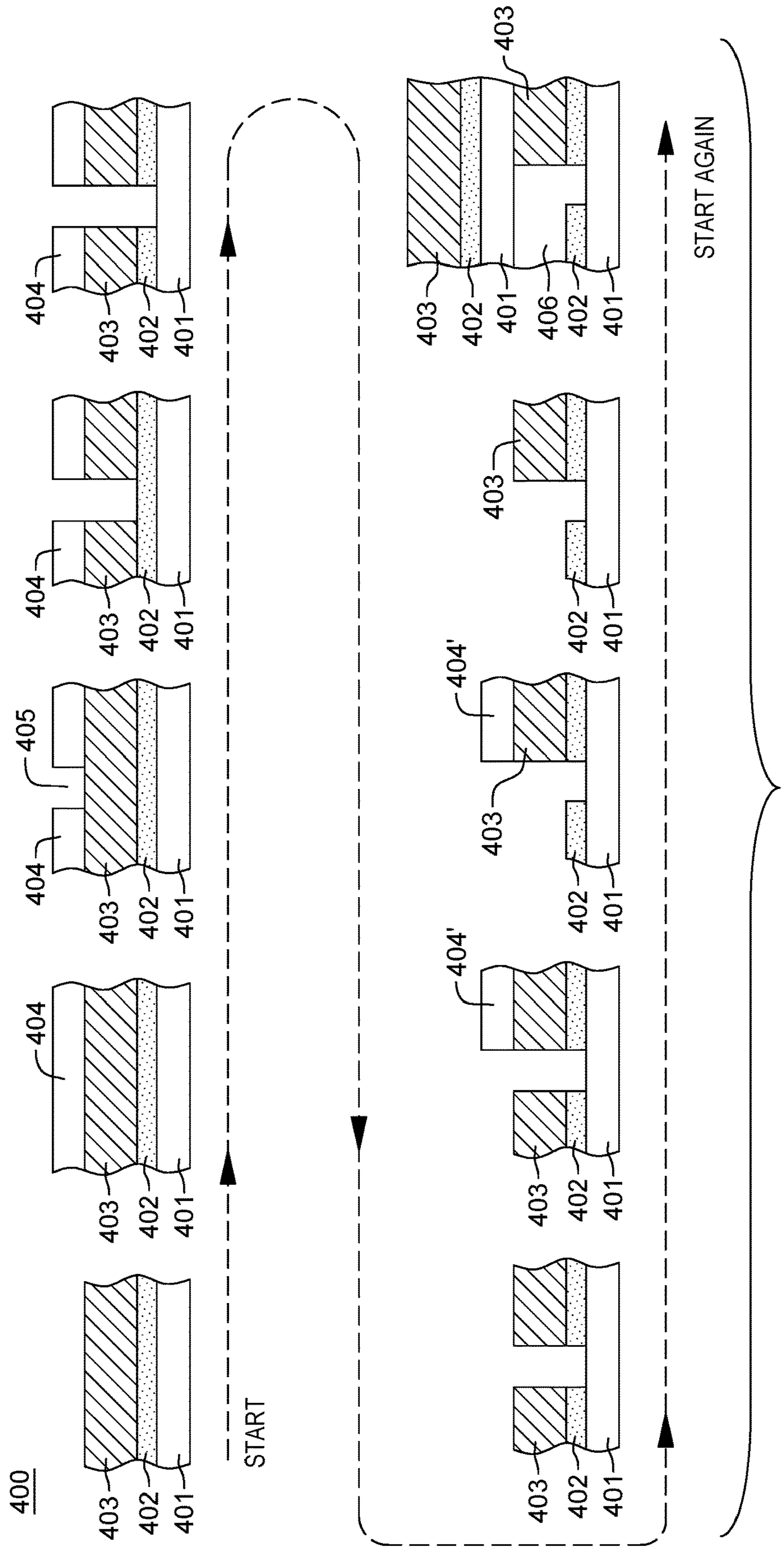
FIG. 4 depicts one embodiment of a process of fabricating a laminate carrier or multilayer circuit board with embedded tamper-detect circuitry for a tamper-detect assembly, in accordance with one or more aspects of the present disclosure.

In one or more implementations, the multilayer circuit board can be a multilayer wiring board or printed circuit board, or card, formed, for instance, by building up the multiple layers of the board. FIG. 4 illustrates one embodiment for forming and patterning a tamper-detection layer within such a multilayer circuit board.

As illustrated in FIG. 4, in one or more implementations, a tamper-detection layer, such as a tamper-detection mat layer or a tamper-detection frame disclosed herein, can be formed by providing a material stack comprising, at least in part, a structural layer 401, such as a pre-preg (or pre-impregnated) material layer, a trace material layer 402 for use in defining the desired trace patterns, and an overlying conductive material layer 403, to be patterned to define conductive contacts or vias electrically connecting to the pattern of traces being formed within the trace material layer 402, for instance, at trace terminal points. In one or more implementations, the trace material layer 402 can include nickel phosphorous (NiP), and the overlying conductive layer 403 can include copper. Note that these materials are identified by way of example only, and that other trace and/or conductive materials may be used within the build-up 400.

A first photoresist 404 is provided over build-up 400, and patterned with one or more openings 405, through which the overlying conductive layer 403 can be etched. Depending on the materials employed, and the etch processes used, a second etch process can be desired to remove portions of trace material layer 402 to define the conductive traces of the subject tamper-detection layer. First photoresist 404 can then be removed, and a second photoresist 404' is provided over the conductive layer 403 features to remain, such as the input and output contacts. Exposed portions of conductive layer 403 are then etched, and the second photoresist 404' can be removed, with any opening in the layer being filled, for instance, with an adhesive (or pre-preg) 406 and a next build-up layer is provided, as shown. Note that in this implementation, most of overlying conductive layer 403 is etched away, with only the conductive contacts or vias remaining where desired, for instance, at the terminal points of the traces formed within the layer by the patterning of the trace material layer 402. Note that any of a variety of materials can be employed to form the conductive lines or traces within a tamper-detection layer. Nickel-phosphorous (NiP) is particularly advantageous as a material since it is resistant to contact by solder, or use of a conductive adhesive to bond to it, making it harder to bridge from one circuit or trace to the next during an attempt to penetrate into the protected secure volume of the electronic circuit. Other materials which can be employed include OhmegaPly®, offered by Ohmega Technologies, Inc., of Culver City, California (USA), or Ticer™, offered by Ticer Technologies of Chandler, Arizona (USA).

The trace lines or circuits within the tamper-detection layers, and in particular, the tamper-detection circuit zones, of the embedded tamper-detect circuit, or security circuit, along with the tamper-respondent sensor monitoring the enclosure, can be electrically connected to monitor circuitry provided, for instance, within secure volume 101 (FIG. 1A) of the tamper-respondent assembly. The monitor circuitry can include various bridges or compare circuits, and conventional printed wiring board electrical interconnect inside secure volume 101 (FIG. 1A), for instance, located within the secure volume defined by the tamper-detection frames 301 (FIG. 3), and the tamper-detection mat layers 300 (FIG. 3).

Note that advantageously, different tamper-detection circuit zones on different tamper-detection layers can be electrically interconnected into, for instance, a common tamper-detect circuitry. Thus, any of a large number of interconnect configurations are possible. Note also, that the power supply or battery for the tamper-respondent sensor(s) can be located internal or external to the secure volume, with the sensor being configured in one or more embodiments to trip and destroy any protected or critical data if the power supply or battery is tampered with.

Figure 5:
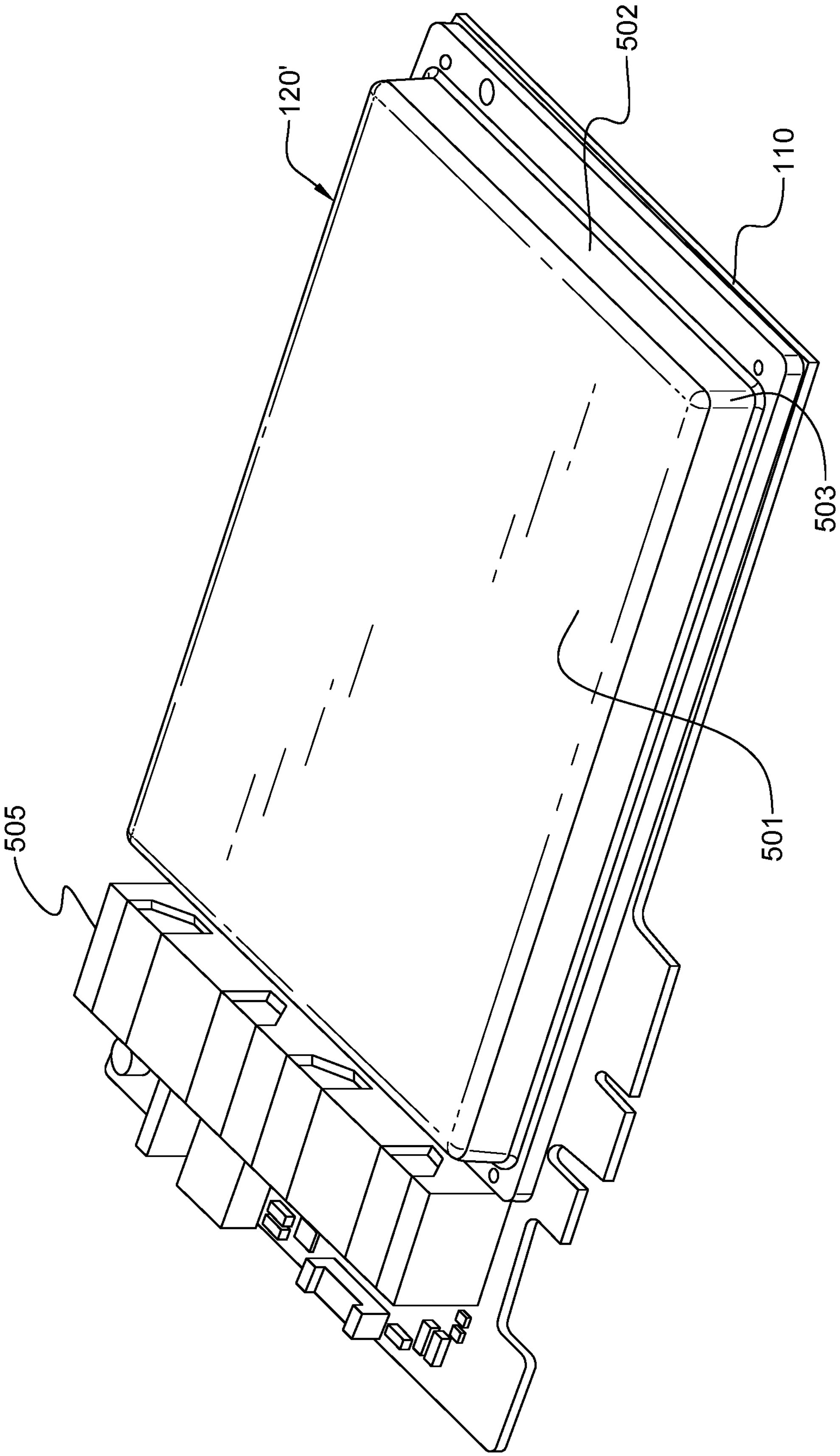
FIG. 5 is an isometric view of one embodiment of a tamper-detect assembly.

By way of further example, an isometric view of one embodiment of a tamper-detect assembly is depicted in FIG. 5, where an enclosure 120' (such as enclosure 120 of FIG. 1A) is shown sealed to multilayer circuit board 110 to define a secure volume about one or more electronic components. In the embodiment depicted, enclosure 120' is formed of a thermally conductive material, and includes a main surface 501 and sidewall(s) 502 which include sidewall corners 503. An inner surface of enclosure 120' includes an inner main surface, and an inner sidewall surface corresponding to main surface 501 and sidewall(s) 502 respectively, with the inner main surface and inner sidewall surfaces being covered, in one embodiment, by one or more tamper-respondent sensors, such as described above with reference to FIGS. 1A-2. A power supply 505 or battery for the tamper-respondent sensor can be located, as depicted in this embodiment, external to the secure volume, with the tamper-detector being configured to destroy any protected or critical data if the power supply or battery is tampered with. Enclosure 120' can be adhered to multilayer circuit board 110, which as noted herein, can include its own tamper protection in a variety of configurations.

When considering tamper-proof packaging, the electronic package needs to achieve defined tamper-proof requirements, such as those set forth in the National Institutes of Standards and Technology (NIST) Publication FIPS 140-2, which is a U.S. Government Computer Security Standard, used to accredit cryptographic modules. The NIST FIPS 140-3 defines four levels of security, named Level 1 to Level 4, with Security Level 1 providing the lowest level of security, and Security Level 4 providing the highest level of security. At Security Level 4, physical security mechanisms are provided to establish a complete envelope of protection around the cryptographic module, with the intent of detecting and responding to any unauthorized attempt at physical access. Penetration of the cryptographic module enclosure from any direction has a very high probability of being detected, resulting in the immediate zeroization of all plain text critical security parameters (CSPs).

A potential issue with a flexible security mesh lining an inner surface of an enclosure is that it might be susceptible to tampering, particularly at the corners and edges due to bending and stretching of the security mesh, which could potentially compromise the security circuit. Stretching of a tamper-respondent sensor with flexible layers can also reduce the width of the conductive traces, which can leave a larger area for a malefactor in which to attempt access into the secure volume without triggering the monitor circuit. Additional conductive traces can be added to flexible security meshes, but additional traces can lead to a lower change in resistance when a tamper event occurs, making the attempted intrusion more difficult to detect. Another issue with existing tamper-detect assembly approaches is the need to remove heat from the secure volume of the tamper-proof package. The need within the electronics industry for faster and more densely packed circuits continues to have a direct impact on the importance of thermal management for certain components. For instance, power dissipation, and therefore, heat production, increases as device operating frequencies increase. Also, increased operating frequencies are possible at lower device-junction temperatures. Further, as more and more components are packaged onto a single chip, heat flux (Watts/$cm^2$) increases, resulting in the need to dissipate more power from a given sized chip, module or system.

By way of further example, there is constant pressure to reduce size and increase performance of electrical components in today's computers. In particular, hardware security modules are ripe for a reduction in size. Hardware security modules (HSMs) are an example of a tamper-detect assembly (such as disclosed herein), and are conventionally built on peripheral component interconnect (PCI) compliant printed circuit boards, which are relatively large and take up valuable space. Changing the form factor of conventional hardware security modules from, for instance, a PCI-compliant printed circuit board format which houses various key components as individually-packaged modules on a circuit board, to a multi-chip module design (such as described hereinbelow), which houses the various key components integrated within a single package, enables a smaller package, with improved security, and reduced overall costs. Furthermore, shrinking the overall form factor of conventional security modules is required to support future technologies to meet more stringent federal guidelines for security compliance. Also, future technology systems may not have room to accommodate a full-size, or even half-size, PCI-compliant security card. Within this context, there is also the need to provide tamper-detect assemblies with enhanced cooling for current and future high-heat load, high-heat flux electronic components packaged within the tamper-detect assemblies.

Embodiments of the present disclosure include, in part, a multi-chip hardware security module; however, building a security module using a multi-chip module form factor can come with challenges. Specifically, building a hardware security module using a multi-chip module form factor presents unique heat dissipation and structural rigidity concerns not encountered with hardware security modules built on PCI compliant printed circuit boards. For instance, conventional multi-chip modules are built with a metal or metallic module lid which serves an integral function to transfer or dissipate heat from the multi-chip module. The metal module lid of conventional multi-chip modules also provides structural rigidity to the package in order to prevent cracking during installation, warping during operation, or both. Also, the metal module lid of conventional multi-chip modules does not include tamper-detect circuitry and therefore may allow for module security to be compromised.

As such, the disclosed multi-chip hardware security modules (or more generally, tamper-detect assemblies) cannot be built with a standard metal module lid. Also, maintaining a tamper-detect physical security envelope is essential to the function of a hardware security module, regardless of its form factor. The tamper-detect physical security envelope includes tamper-detect or sensor circuitry completely surrounding the electronic components to be protected, and provides a tamper-detect package or tamper respondent package.

In one or more embodiments, the sensor circuitry includes a plurality of closely spaced conductive traces or lines, and when one or more of the conducive traces is broken a flag is set or alarm generated, indicating that the package has been physically tampered with. Briefly, the tamper-detect assembly can include a hardware, software, or a combination hardware and software monitor component and/or circuit component which can, in one or more embodiments, include a compare circuit or logic located within the secure volume. In one or more embodiments, the monitor component can include bridge or compare circuits. Also, if desired, different tamper-detect circuit zones on different tamper-detect circuit layers can be connected into, for instance, a same comparator circuit or Wheatstone bridge of the monitor circuitry or component. In this manner, any of a large number of interconnect configurations can be possible. For instance, if each tamper-respondent mat layer (discussed above in connection with FIG. 3) contains thirty tamper-respondent circuit zones, and each tamper-respondent frame contains four tamper-respondent circuit zones, then, for instance, the resultant 68 tamper-respondent circuit zones can be connected in any configuration within the secure volume to create the desired arrangement of circuit networks within the secure volume being monitored for changes in resistance or tampering. In one or more other embodiments, the monitor circuitry can use coupled sets of paired conductive lines, which are connected between ground potential and a power supply, such as a battery or bank of batteries, provided as part of the tamper-detect assembly or in association with the tamper-detect assembly. In this embodiment, the monitor circuitry or monitor component can monitor for resistance (and/or induction and/or capacitance) differences between conductive lines of the paired conductive lines in the sets of paired conductive lines. Those skilled in the art will note that other monitor component or monitor circuitry configurations can be employed to, for instance, separately, differentially monitor resistance, or other electrical characteristics, between conductive lines of a pair of matching conductive lines in one or more circuit layers of the tamper-respondent sensor. A variety of other monitoring and comparing embodiments are possible to facilitate determining whether a tamper event has occurred.

The present disclosure generally relates to tamper-detect assemblies, such as hardware security modules, and more particularly to thermally enhanced module lids and heat sink covers for tamper-detect assemblies, such as multi-chip hardware security modules. Exemplary tamper-detect assembly embodiments with a thermally enhanced module lid are initially described in detail below with reference to FIGS. 6-8, and exemplary tamper-detect assembly embodiments with heat sink covers are described in detail below with reference to FIGS. 9A-12. Those skilled in the art will appreciate that the detailed description given herein with respect to these figures is for explanatory purposes as the disclosure extends beyond the embodiments depicted herein.

Figure 6:
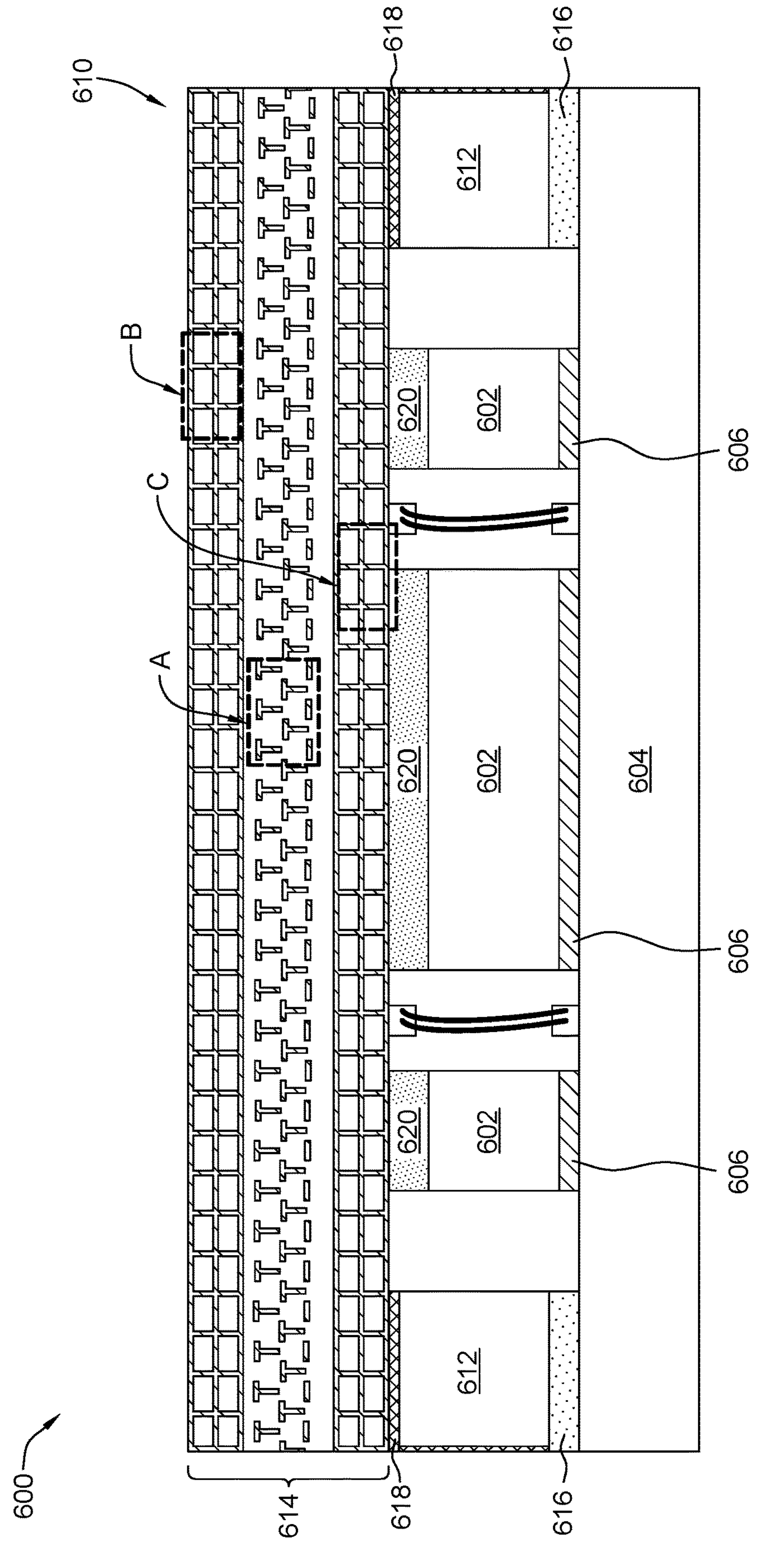
FIG. 6 is a cross-sectional elevational view of one embodiment of a tamper-detect assembly, in accordance with one or more aspects of the present disclosure.

Referring to FIG. 6, one embodiment of a module assembly 600 or tamper-detect assembly is shown. Module assembly 600 (hereinafter "module"), or alternatively, an electronic package or multi-chip module (MCM), can include one or more electronic components 602 secured to a laminate carrier 604 with interconnect bumps and an underfill adhesive, collectively labeled 606. The one or more electronic components 602 mounted to laminate carrier 604 can include, for instance, one or more of the following: application-specific integrated circuits (ASICs), several hybrid memory cubes (HMCs), high bandwidth memory (HBM), dynamic random access memory (DRAM) chips, trusted platform modules (TPMs), flash memory, ARM processors, Serial (PC) Electrically Erasable Programmable Read Only Memory (SEEPROM), and capacitors. In one or more embodiments, one or more electronic components 602 of module assembly 600 can generate significant heat and require cooling to preserve module performance, prevent module failure, or both. Module assembly 600 can be attached to a socket or receptacle (not shown) on a circuit board, or processor board, by way of, for instance, land grid array (LGA) or ball grid array (BGA) connectors.

The laminate carrier 604 can be any one of several kinds of surface mount technology substrates used for integrated circuits. Examples include a circuit board, a printed board, a printed circuit board, a multi layered printed circuit board, an alumina board, a ceramic laminate board, a glass-ceramic laminate board, and organic laminate board, etc.

Laminate carrier 604 further includes operational circuitry and sensor circuitry (or embedded tamper-detect circuitry) laminated in multiple layers of a non-conductive material or combination of non-conductive materials, such as, for example epoxy, fiberglass reinforced plastic, polyimide, etc. The operational circuitry can include a plurality of conductive layers and vias to which the electrical components 602 are connected. The sensor circuitry is separate and apart from the operational circuitry, and is used to provide the tamper-detect physical security envelope for module 600.

Module assembly 600 further includes a lid 610 (or cover) to cover and protect electronic components 602 of module assembly 600. Lid 610 further conducts heat away from electronic components 602 of module assembly 600. Unlike conventional all metal lids, in one or more embodiments, lid 610 has a similar construction, in general, as laminate carrier 604. For example, lid 610 can be a laminate carrier designed and fabricated to cover, protect, and effectively remove heat from electronic components 602. Like laminate carrier 604, lid 610 also includes (in one or more embodiments) conductive features laminated in multiple layers of a non-conductive material or combination of non-conductive materials, such as, for example epoxy, fiberglass reinforced plastic, polyimide, etc. One or more conductive features of lid 610 can be specifically designed and located to complete the sensor circuitry, while other conductive features of lid 610 can be specifically designed and located to provide thermal conduction through the lid to facilitate cooling module assembly 600. The conductive features are described in more detail below with reference to the cross-sectional enlargements A-C of FIG., 6 shown in FIGS. 7A-7C.

In an embodiment, lid 610 is made of multiple pieces including a lid ring 612 and a lid cover 614. As noted above, both lid ring 612 and lid cover 614 can include conductive features laminated in multiple layers of a non-conductive material or combination of non-conductive materials. Specifically, lid ring 612 can include conductive features designed and located to complete the sensor circuitry, while lid cover 614 can include conductive features designed and located to complete the sensor circuitry, as well as conductive features to provide thermal conduction of heat through the lid to facilitate cooling of module assembly 600.

In general, lid ring 612 can have a square or rectangular window frame shape with a space or opening in the middle to accommodate electronic components 602. The shape of lid ring 612 generally mimics the overall shape of module assembly 600. For example, a square module 600 will likely be configured with a square lid ring 612, and similarly a square lid cover 614. The exact shape of lid 610, lid ring 612 or lid cover 614 can vary with different embodiments of the disclosure.

According to an alternative embodiment, lid 610 is a single piece lid with a cavity that encompasses the electronic components mounted to laminate carrier 604, and a peripheral sealing foot for attachment along the periphery to laminate carrier 604. In yet another embodiment, lid 610 is a single congruent laminate structure having a cavity that is designed to house the electronic components mounted to laminate carrier 604, and a peripheral sealing foot for attachment along the periphery to laminate carrier 604.

Although module assembly 600 is illustrated and described with a conventional square/rectangle shape, persons of ordinary skill in the art can adapt features of the present disclosure to accommodate any desired shape. As such, lid 610, lid ring 612 or lid cover 614 can be configured with virtually any shape required within manufacturing tolerances.

In one embodiment, lid ring 612 is bonded to a top surface of laminate carrier 604 with an adhesive 616, such as, for example, Hysol Adhesive. A conductive connection between laminate carrier 604 and lid 610 is advantageous to maintain continuity of the sensor circuitry, which is desired for operation of module assembly 600. Further, a mechanical connection between laminate carrier 604 and lid 610 is also used to provide adequate structural rigidity to module assembly 600 and prevent damage, such as to electronic components 602. As such, adhesive 616 is chosen to provide the desired conductive and mechanical connections between laminate carrier 604 and lid 610, generally.

Specifically, in the illustrated embodiment, adhesive 616 provides a conductive and mechanical connection between the laminate carrier 604 and lid ring 612, and lid cover 614 is mounted and secured to lid ring 612. Lid 614 is coupled to a top surface of lid ring 612 with a conductive interconnect 618, such as, for example, micro-vias or a sintered interconnect. In one or more embodiments, conductive interconnect 618 provides both an electrical and mechanical connection between lid ring 612 and lid cover 614 to maintain continuity of the sensor circuitry.

Further, lid ring 612 of the present embodiment has a height at or above the tallest electronic component 602 so that laminate lid 610 can be installed in module assembly 600 properly.

During assembly, a thermal interface material 620 can be sandwiched between electronic components 602 and lid 610 to allow thermal conduction from electronic components 602 to lid 610 for purposes of cooling the module assembly 600 during operation. In one or more applications, a heat sink, cold plate, or other cooling apparatus can be separately mounted atop lid 610. As such, the construction of the lid 610 is configured for heat management. To facilitate this, in one or more embodiments, lid 610 can be designed to transfer heat from electronic components 602 outward. This can be accomplished with the addition of thermally conductive circuitry such as described below with reference to FIGS. 7A-7C.

Figure 7A:
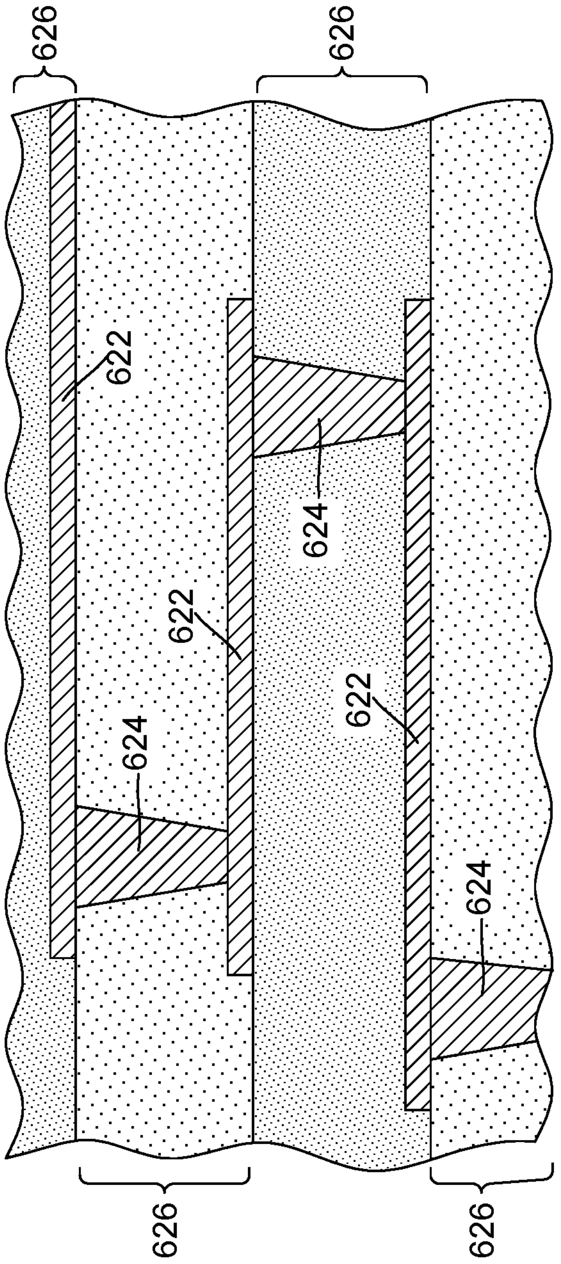
FIGS. 7A-7C are respective enlarged cross-sectional views of sections A-C of the tamper-detect assembly of FIG. 6, in accordance with one or more aspects of the present disclosure.
Figure 7B:
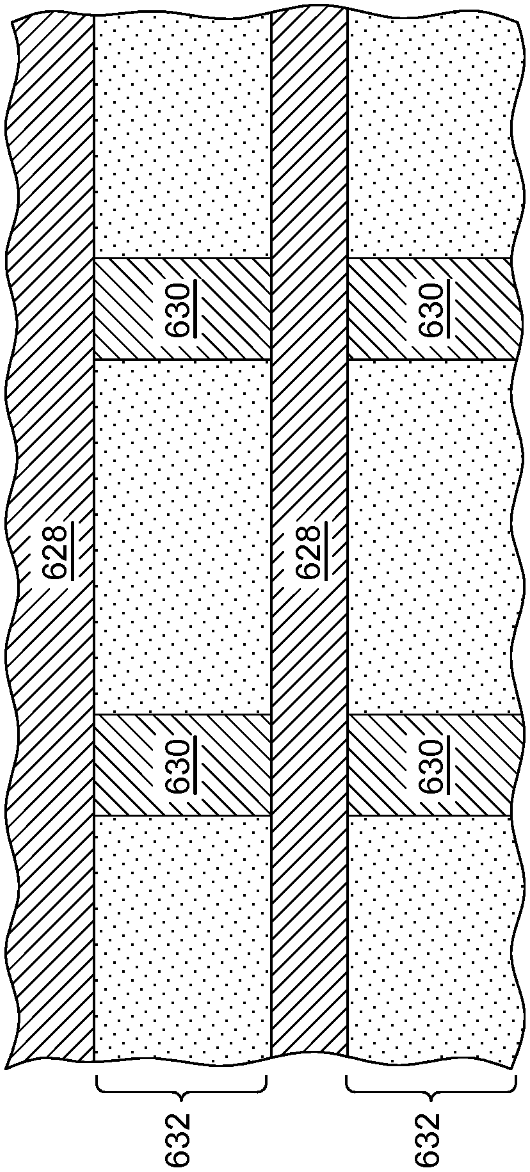
Figure 7C:
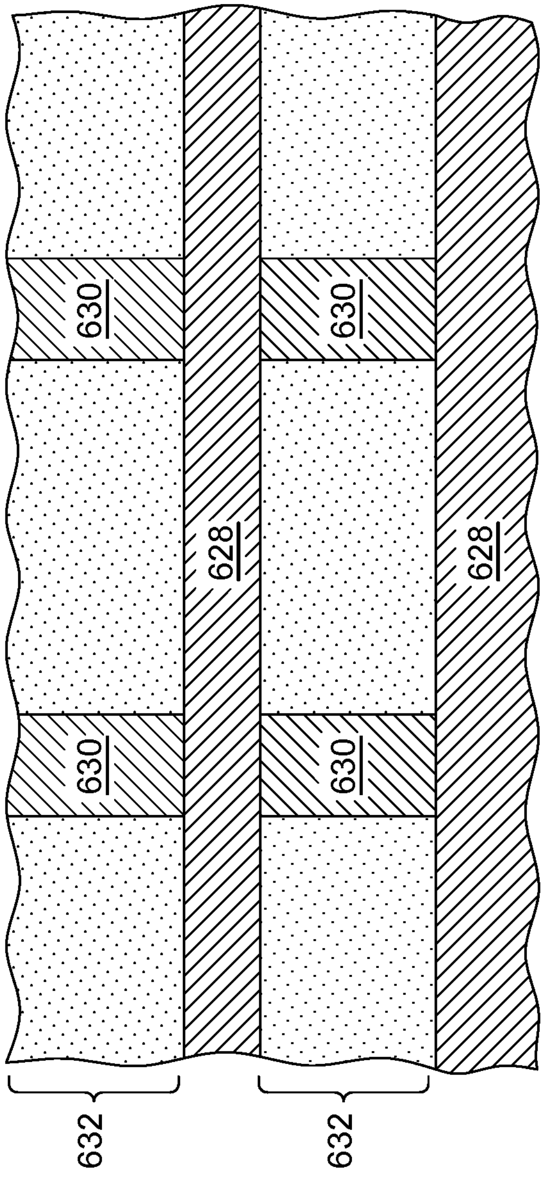

Referring to FIGS. 7A-7C, multiple cross-sectional views of lid cover 614 are depicted as examples of the sensor circuitry and thermal circuitry of one embodiment of module assembly 600. FIG. 7A depicts section view A in FIG. 6. FIG. 7B depicts section view B in FIG. 6, and FIG. 7C illustrates section view C in FIG. 6.

As described, module assembly 600 is fitted with sensor or tamper-detect circuitry which, in one or more embodiments, completely surrounds electronic components 602 and provides a tamper-detect physical security envelope. In order to completely surround electronic components 602, sensor circuitry is provided within laminate carrier 604, lid ring 612, and lid cover 614. Configured with the sensor circuitry, module assembly 600 is a tamper-detect package or a tamper respondent package. The sensor circuitry includes tamper sensors and associated circuitry that completely surrounds electronic components 602 of module assembly 600. In one embodiment, the sensor circuitry can be adapted to have a continuous electrical signal distributed throughout. Damage to the sensor circuitry results in a detectable variation in one or more electrical characteristics of the electrical signal, such as, for example, resistance, current, capacitance, or some combination thereof. Variations from predefined target values in one or more electrical characteristics can be designed to indicate some disruption of the module or trigger an alarm. In an embodiment, the sensor circuitry is further electrically coupled to, for instance, at least one electronic component of electronic components 602, and uses, or includes, a power source. The sensor circuitry can be further adapted to alter or destroy information contained in the at least one electronic component 602 in response to any detected damage to the sensor circuitry.

With reference to FIG. 7A, a portion of the sensor circuitry in the lid is shown. As illustrated, in one or more embodiments, the sensor circuitry can include metal lines 622 (or traces) and staggered vias 624 integrated across multiple non-conductive layers of the lid, for example, across layers 626. Metal lines 622, or security traces, can be relatively thin and made from any suitable conductive material, such as, for example, copper, or other materials described herein, for instance, with reference to FIGS. 2-4. Since the sensor circuitry is the primary function of metal lines 622, the line size and material can be chosen according to the desired sensor circuitry characteristics. In one or more embodiments, metal lines 622 can be smaller relative to other metallic structures in the lid, such as the thermally conductive circuitry discussed below. In at least one embodiment, the lid includes at least two laminated layers with the sensor circuitry.

Similarly, staggered vias 624 are relatively small, for example micro-vias, and made from any suitable conductive material, such as, for example, copper. Since the sensor circuitry is the primary function of staggered vias 624, the size and material can be chosen according to the desired sensor circuitry characteristics. In an embodiment, the staggered vias 624 are smaller than other similar metallic structures of the lid, such as used for the thermally conductive circuitry. The sensor circuitry illustrated and descried above with reference to the lid is also meant to be representative of sensor circuitry provided in the laminate carrier or the lid ring (in one embodiment).

As described, the module assembly is fitted with thermally conductive circuitry, which is uniquely configured to transfer heat from the electronic components outward, for instance, to preserve module performance, prevent module failure, or both. In an embodiment, the thermally conductive circuitry is provided only in the lid, as illustrated in FIG. 6. However, in an embodiment, the thermal circuitry can be integrated into other components of the module assembly 600 without undue experimentation.

Referencing FIGS. 7B & 7C, portions of the thermally conductive circuitry in lid 614 are shown. As illustrated, the thermally conductive circuitry includes a network of thicker metal layers 628 and thermally conductive through vias 630 integrated across multiple non-conductive layers of the lid, such as, for example, layers 632.

In one or more embodiments, the thermal circuitry includes multiple thick metal layers 628 physically joined by multiple thermally conductive through vias 630, as illustrated in FIGS. 7B & 7C. In an embodiment, the thermally conductive circuitry includes, for example, solid copper planes (628) on a top surface of the lid cover and a bottom surface of the lid cover, and thermally conductive through vias (630) in direct contact with the solid copper planes (628). In general, in one embodiment, the thermal circuitry is configured with sufficient thermally conductive mass to efficiently and effectively conduct heat from the electronic components for dissipation by an attached heat sink or other cooling apparatus. In an embodiment, thickness or size of thick metal layers 628 and thermally conductive through vias 630 is optimally designed for heat spreading and thermal conduction, while also supporting the sensor circuitry's ability to adequately detect a tamper event, as well as manufacturability of the lid balanced with the thickness of the individual layers of non-conductive material. For example, while relatively thinner traces are preferable for heat conduction through the vertical (z) direction, relatively thicker traces provide better heat spreading in the lateral (x, y) direction. Similarly, a number of shorter and thicker vias can be better for heat conduction; however, doing so might be constrained by electrical design criteria and manufacturability of the module.

The sensor circuitry and the thermally conductive circuitry in the embodiment of FIGS. 6-7C can be provided in any number of configurations and still provide the advantages and performance noted above. In one embodiment, the sensor circuitry is generally located in the central layers of lid cover 614 (FIG. 6) and the thermally conductive circuitry is generally located in the upper-most layers adjacent to a top surface of lid cover 614, and the lower-most layers adjacent to a bottom surface of lid cover 614. In an alternative embodiment, the sensor circuitry can be located in the upper-most layers of lid cover 614, while the thermally conductive circuitry can be located in the central and lower-most layers of lid cover 614. In yet another embodiment, the sensor circuitry can be located in the lower-most layers of lid cover 614, while the thermally conductive circuitry can be located in the central and upper-most layers of lid cover 614. According to another embodiment, the sensor circuitry can be located in the lower-most layers of lid cover 614 and the upper-most layers of laminate carrier 604 closest to electronic components 602. In one or more embodiments, thermal efficiency is enhanced when both the heat sink and the thermal interface material atop the electronic components 602 directly contacts at least a portion of the thermally conductive circuitry.

Figure 8:
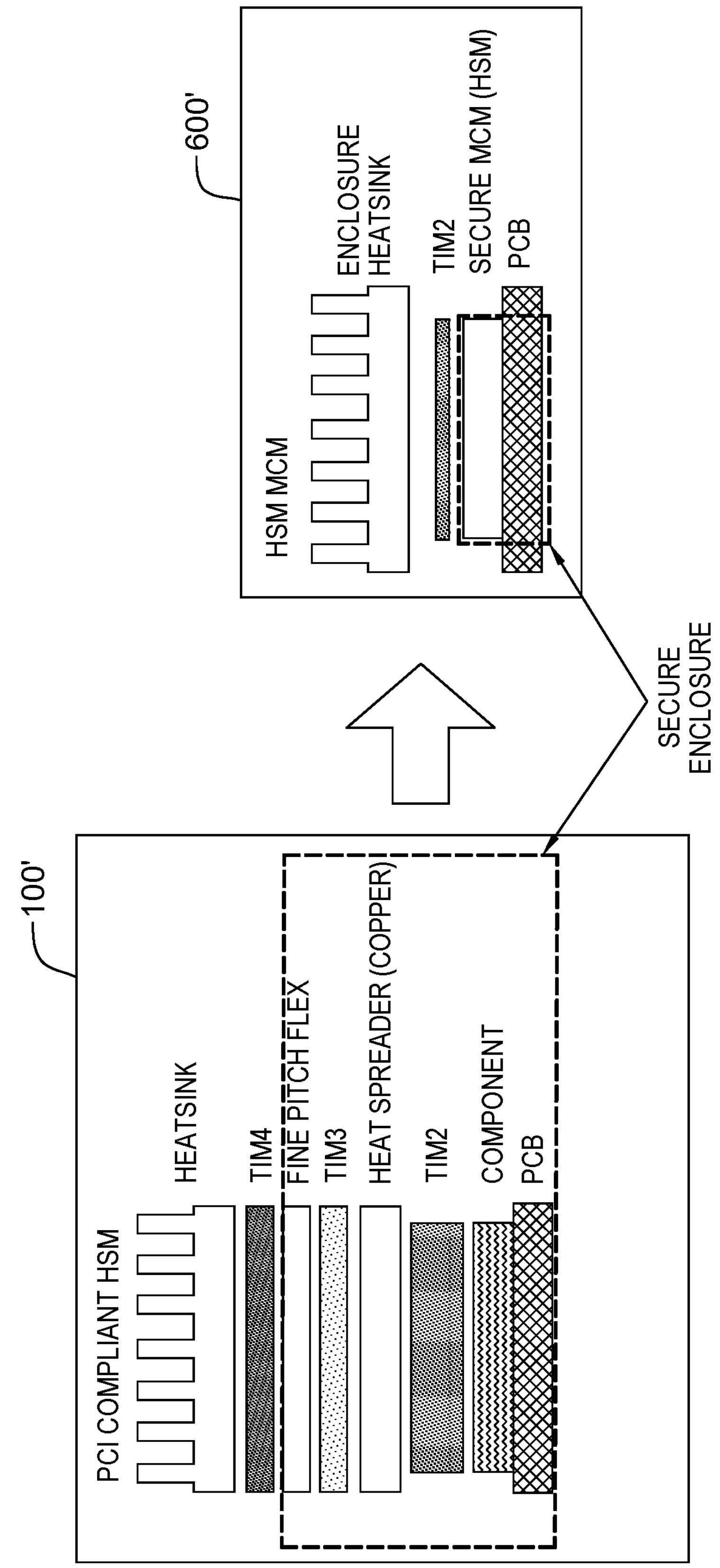
FIG. 8 is a stack-up comparison of a tamper-detect assembly embodiment of FIGS. 1A-3 compared with a tamper-detect assembly embodiment of FIGS. 6-7C, in accordance with one or more aspects of the present disclosure.

By way of example, FIG. 8 illustrates a simplified assembly module 600' version of module assembly 600 of FIG. 6, compared with a conventional PCI-compliant tamper-detect assembly 100', such as tamper-detect assembly 100 of FIGS. 1A-1B. As illustrated, module assembly 600' presents a significant reduction in size over the prior tamper-detect assembly 100' solution. This is accomplished by reducing the number of structural layers in the package to improve both security and thermal conduction. For example, module assembly 600' implements a smaller tamper-detect security envelope. Stated differently, less structure and fewer components are included in the tamper-detect security envelope of the module assembly 600' as compared with the assembly 100' of the prior structures. In turn, the module assembly 600' is less complicated, contains fewer layers/interfaces, is easier to manufacture and easier to assemble.

By way of further enhancement, disclosed herein with reference to FIGS. 9A-12, are further thermally-enhanced tamper-respondent assemblies, in accordance with one or more aspects disclosed herein. For instance, in one or more aspects, a multi-chip module package is provided with embedded tamper-detect circuitry or embedded security circuitry, as well as embedded heat sink cooling for direct-cooling of one or more electronic components within the secure volume defined by the tamper-detect assembly.

Figure 9A:
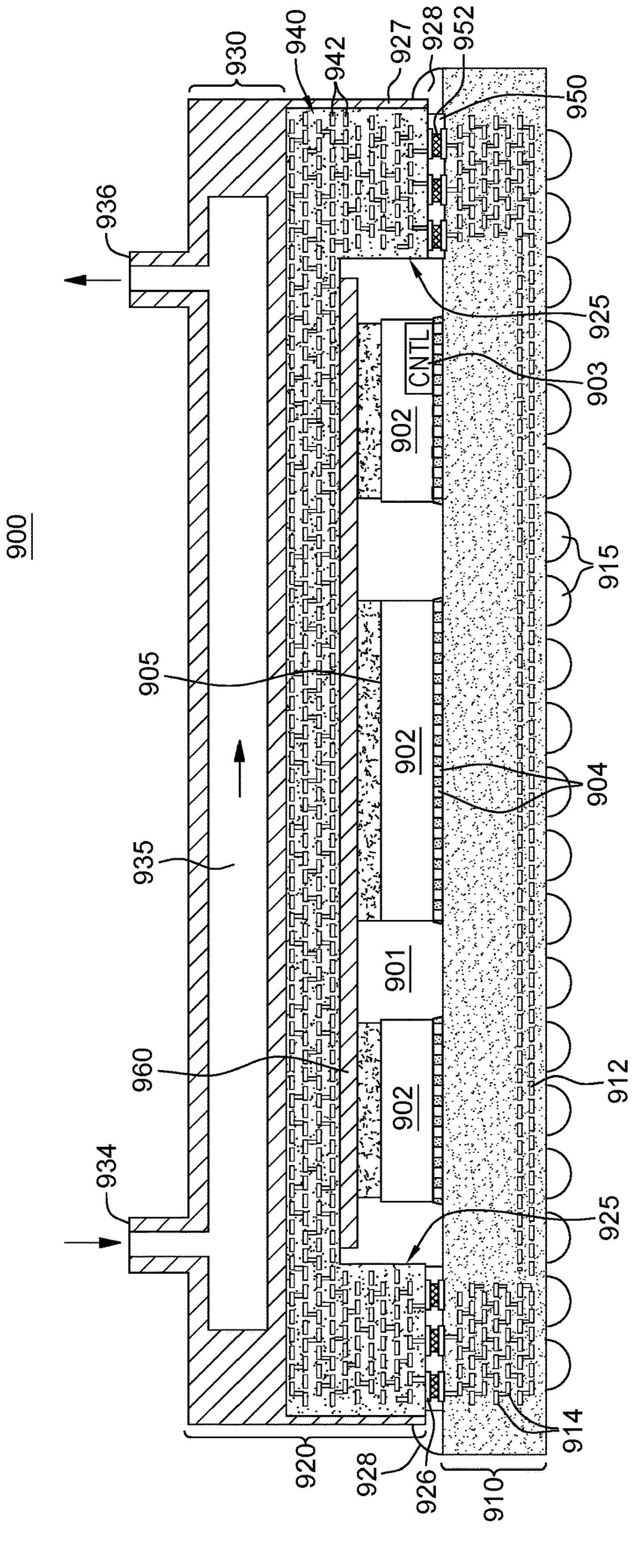
FIG. 9A depicts one embodiment of a tamper-detect assembly including a heat sink cover with integrated tamper-detect circuitry, in accordance with one or more aspects of the present disclosure.

Referring to FIG. 9A, one embodiment of a tamper-detect assembly 900 is depicted, in accordance with one or more aspects of the present disclosure. Tamper-detect assembly 900 includes a laminate carrier 910 with embedded tamper-detect circuitry 912, 914 within laminate carrier 910. By way of example, in one or more embodiments, laminate carrier 910 can be an organic laminate carrier with embedded tamper-detect circuitry 912 being one or more tamper-detection mat layers, such as tamper-detection mat layers 300 described above in connection with FIG. 3, and embedded tamper-detect circuitry 914 being, for instance, one or more peripheral security layers or tamper-detection frames, such as tamper-detection frames 301 described above in connection with FIG. 3. In one implementation, the laminate carrier can include on one side a ball grid array (BGA) 915 or other conductive contact array for operatively coupling the tamper-detect assembly to a larger circuit board, such as described herein.

Note that in the embodiment of FIG. 9A, tamper-detect assembly 900 is depicted as a single multi-chip module package, with one or more electronic components 902, such as one or more semiconductor die, operatively positioned within a secure volume 901 defined between laminate carrier 910 and a heat sink cover 920. As noted above, secure volume 901 can extend above and into laminate carrier 910 within the space surrounded by embedded tamper-detect circuitry 912, 914, as illustrated in FIG. 9A. Electronic component-to-laminate connections 904 are provided to, for instance, electrically connect the individual electronic components to circuitry on or within laminate carrier 910. Further, a thermal interface material 905 is shown in FIG. 9A coupling in thermal contact electronic components 902 within secure volume 901 to the underside of heat sink cover 920. By way of example, a control 903 (CNTL) or control module can be implemented on one or more electronic components 902 within secure volume 901. In one embodiment, control 903 implements a monitor component such as described herein for detecting a tamper event, based on one or more signals being monitored on the tamper-detect circuitry within laminate carrier 910 and within heat sink cover 920, as well as an interface security layer 952 connecting the laminate carrier and heat sink cover. One embodiment of a tamper-detect monitor module implemented by control 903 is described further below with reference to the computing environment example of FIG. 13.

As depicted in FIG. 9A, heat sink cover 920 (or heat sink lid) includes a heat sink 930, which in the embodiment depicted, is a coolant-cooled heat sink with one or more coolant-carrying channels 935 in fluid communication with one or more coolant inlet ports 934 and one or more coolant outlet ports 936 through which the coolant passes. In one or more embodiments, coolant passing through the coolant-cooled heat sink can be any fluid, such as a liquid, gas, or a liquid and gas mixture, depending on the implementation, and the desired coolant characteristics. For instance, the type of coolant or fluid passing through heat sink 930 can vary, depending on the embodiment, and the desired heat removal characteristics of the fluid.

In addition to heat sink 930, heat sink cover 920 further includes tamper-detect circuitry 940 integrated within the heat sink cover, with the integrated tamper-detect circuitry 940 of heat sink cover 930 being electrically connected, in one or more embodiments, to the embedded tamper-detect circuitry 912, 914 within laminate carrier 910, by electrical connection through interface security layer 952 provided at the peripheral interface of heat sink cover 920 and laminate carrier 910, as illustrated. In one or more embodiments, interface security layer 952 is surrounded by a structural adhesive 950, which secures heat sink cover 920 to laminate carrier 910, and encloses one or more electronic components 902 between laminate carrier 910 and heat sink cover 920, with the embedded tamper-detect circuitry 912, 914 of laminate carrier 910 and the integrated tamper-detect circuitry 940 of heat sink cover 920 defining, at least in part, secure volume 901 about electronic components 902.

In one or more embodiments, tamper-detect circuitry 940 is integrated within heat sink cover 920 by direct-bonding, or fusion-bonding, tamper-detect circuitry 940 and heat sink 930 together, as well as, in the embodiment illustrated, direct-bonding the tamper-detect circuitry and a thermally conductive base layer 960 of heat sink cover 920 together. In the depicted embodiment, thermally conductive base 960 is disposed between tamper-detect circuitry 940 and the one or more electronic components. Further, in the embodiment of FIG. 9A, thermal interface material 905 provides a thermal conduction path between the one or more electronic components 902 and thermally conductive base 960 of heat sink cover 920. In one or more embodiments, thermally conductive base 960 is sized and configured to function as a heat spreader.

In one or more embodiments, tamper-detect circuitry 940 within heat sink cover 920 includes multiple tamper-detect circuit layers 942, which are direct-bonded together. In one or more implementations, heat sink 930, tamper-detect circuitry 940, and thermally conductive base 960 of heat sink cover 920 are formed to facilitate direct-bonding together as disclosed herein. For instance, a same conductive material, such as a common metal or common metal composite material, could be employed in each, in one embodiment. In one specific embodiment, heat sink 930, tamper-detect circuitry 940, and thermally conductive base 960, can each be made of or include copper (or copper traces in the case of tamper-detect circuitry 940). For instance, the tamper-detect circuitry can include multiple dielectric and conductor layers, where the multiple dielectric and conductor layers are (in one embodiment) multiple ceramic and copper layers (i.e., copper trace layers). As noted, in one or more embodiments, the heat sink and thermally conductive base can also be fabricated of copper. Other metals can alternatively be used. However, copper is advantageous due to both its electrical and thermal properties. Copper direct-bonding or fusion-bonding is an established process in the industry. Individual sheets of copper can be patterned, laid-up and exposed to elevated temperatures over, for instance, 1000° C., to induce partial melting of the copper metal in each of the layers, causing the layers to react and bond with one another. A similar process can also be used to adhere copper to electrically insulating, ceramic substrates. This provides the ability to selectively build layers of conductors and dielectrics to create the tamper-detect circuitry, and direct-bond those layers to, for instance, a heat sink and/or thermally conductive base layer fabricated of copper. In this manner, the entire heat sink cover 920 can be formed by direct-bonding or fusion-bonding the heat sink, tamper-detect circuitry, and thermally conductive base layer together, as well as direct-bonding the multiple dielectric and conductor layers of the tamper-detect circuitry together, in a common thermal fusion process, such as described below.

In the embodiment of FIG. 9A, heat sink cover 920 is further configured with a heat sink cover sidewall 925 containing, in part, integrated tamper-detect circuitry 940 of heat sink cover 920. Note that as used in the context of this application, and as illustrated in FIGS. 9A-11, a sidewall refers to a structure such as illustrated, which forms a seal-foot with a cavity to accommodate the one or more electronic components between the heat sink cover and the laminate carrier. In the illustrated embodiment, heat sink cover sidewall 925 includes an edge 926 mounted to laminate carrier 910 at the peripheral interface of heat sink cover 920 and laminate carrier 910. In this configuration, tamper-detect circuitry 940 integrated within heat sink cover 920 is, at least in part, also embedded within heat sink cover sidewall 925, as shown. In one or more embodiments, edge plating 927 can be provided over heat sink cover sidewall 925 around the outer periphery of the heat sink cover for, for instance, grounding purposes. In addition, a conductive epoxy 928 can be provided as a conductive seal band at the interface of the heat sink cover and laminate carrier.

Figure 9B:
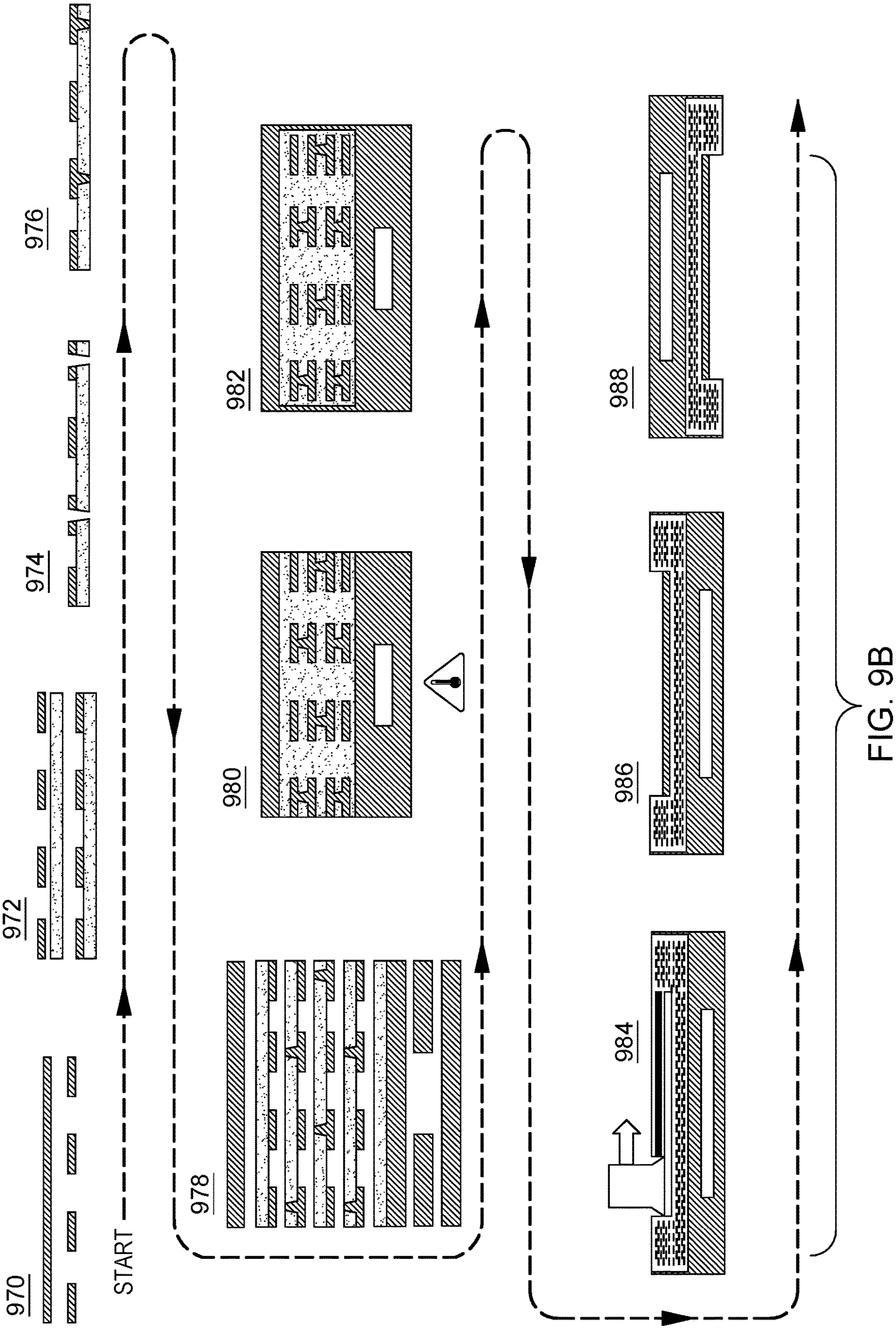
FIG. 9B depicts one embodiment of a process of fabricating a heat sink cover with a heat sink and integrated tamper-detect circuitry, in accordance with one or more aspects of the present disclosure.

By way of example, FIG. 9B illustrates one embodiment of a process for fabricating a heat sink cover, such as heat sink cover 920 of FIG. 9A. As noted, the process uses direct-bonding of various layers within a stack-up of material layers. The process begins with patterning of individual layers 970 (e.g., individual copper layers) using conventional etch processing, in one or more embodiments. The patterned conductive layers are stacked using dielectric layers (e.g., ceramic layers, such as aluminum nitride or aluminum oxide) to establish the desired tamper-detect circuitry layout 972. In one or more embodiments, a conductive layer can be bonded to a dielectric layer for micro-via etching 974, and the micro-vias can be etched and plated with the conductor 976, for instance, copper, in one example. The process repeats to establish the desired stack-up or layout of patterned conductor and dielectric pairs and heat sink layers and thermally conductive base layer 978. In assembling the layout, alignment structures can be provided peripherally, surrounding the desired structure, to aid alignment of the layers during lamination prior to baking. These structures can then be removed, for instance, by machining post-bonding/assembly.

In the embodiment of FIG. 9B, the stack-up 978 is shown upside-down at this point (relative to, for instance, the embodiment of FIG. 9A), with the heat sink material layers at the bottom portion of the layout, and the thermally conductive base of the heat sink cover at the top. Once the structures have been stacked, direct-bonding of the layers is performed, in accordance with one or more aspects described herein by, for instance, baking the stack-up 980 at a sufficient temperature to ensure fusion of the adjacent layers, including the adjacent contacting dielectric and conductor layers. In one embodiment, the stack-up is heated to, for instance, around 1000° C. for a sufficient period of time to ensure diffusion-bonding of the different contacting layers to form an integrated structure without the use of adhesive between the layers of the heat sink cover.

In the embodiment of FIG. 9B, edge plating 982 is performed to form, for instance, an edge-plated ground layer around the heat sink cover. In one or more embodiments, routing or machining 984 and polishing 986 are performed to remove sacrificial layers, such as sacrificial conductive layers provided in the routed cavity area to provide structural enhancement. The completed heat sink cover with integrated heat sink and tamper-detect circuitry is obtained by rotating the cover 988 to ready the cover for stacking, for instance, to a laminate carrier, such as illustrated in FIG. 9A.

Figure 11:
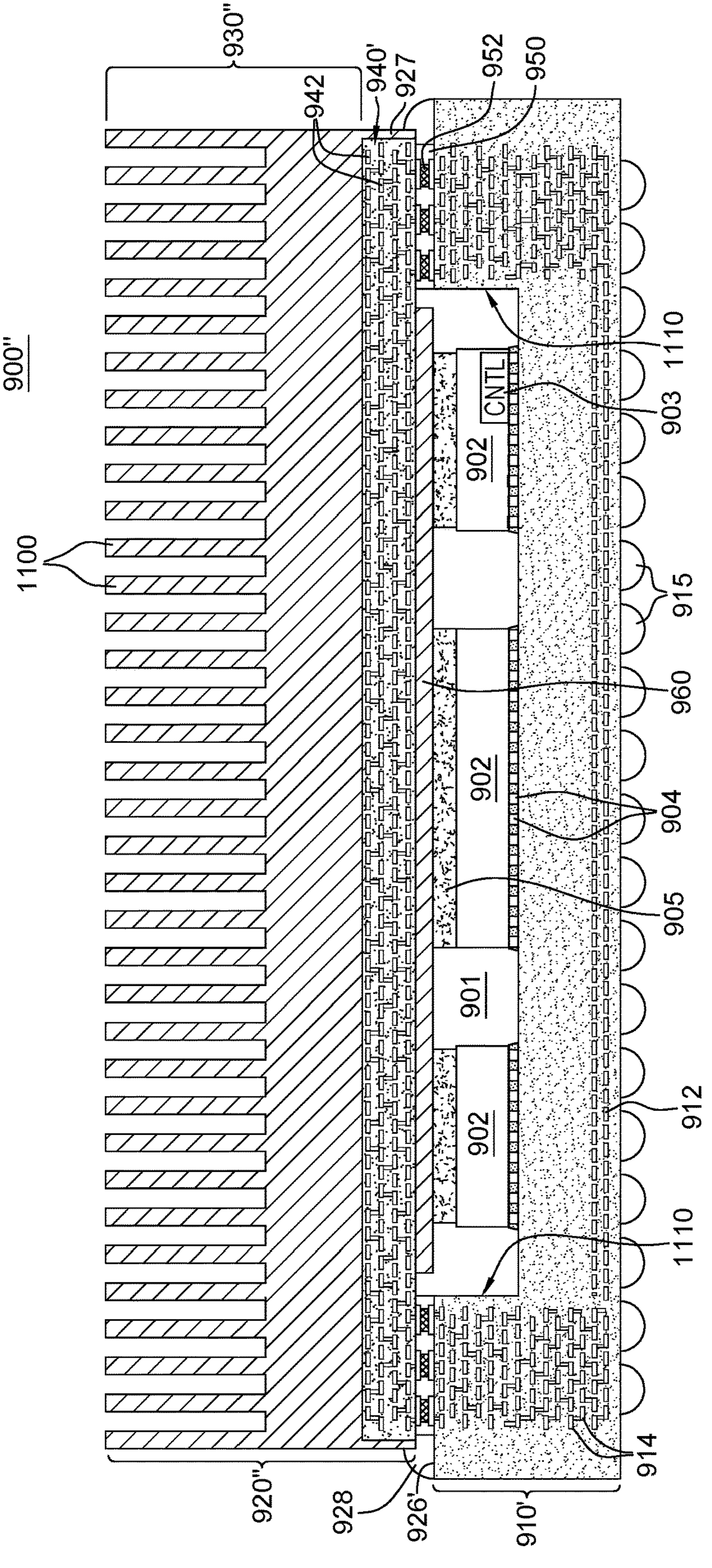
FIG. 11 depicts a further embodiment of a tamper-detect assembly including a heat sink cover with a heat sink and integrated tamper-detect circuitry, in accordance with one or more aspects of the present disclosure.

Those skilled in the art will note that laminate carrier 910 of FIG. 9A can be formed with a variety of configurations, using existing processing techniques, such as described above in connection with the circuit board configuration of FIGS. 3-4. By way of further example, in one or more embodiments, a core of the laminate carrier can be prepared and patterned, and if desired, one or more vias through the core can be drilled or otherwise formed and plated, for instance, to provide electrical connection from one side of the laminate carrier core to the other. Additive build-up steps can then be provided for as many build-up layers as needed for a particular tamper-detect assembly including, for instance, using building-up films, photomask patterning, conductive plating (e.g., copper plating), mask removal, laser drilling, and via plating. In one or more embodiments, the additive build-up, patterning, laser drilling and plating of layers can occur both above and below the patterned core of the laminate carrier. As illustrated in FIG. 11, and described below, a cavity can be formed, in one or more embodiments, by routing, drilling, etc., to establish space to house the electronic components within the secure volume formed, in part, by the laminate carrier. This also can create a top surface of the laminate carrier exposed for placement of electrical contacts to electrically connect the electronic components to the laminate carrier, and in particular, to electrically connect to respective circuitry within the laminate carrier, as desired for a particular application of the tamper-detect assembly. In one or more embodiments, a solder mask application can be employed and contacts, such as C4 contacts, can be formed where desired, for instance, to connect the one or more electronic components within the multi-chip module package.

Figure 10:
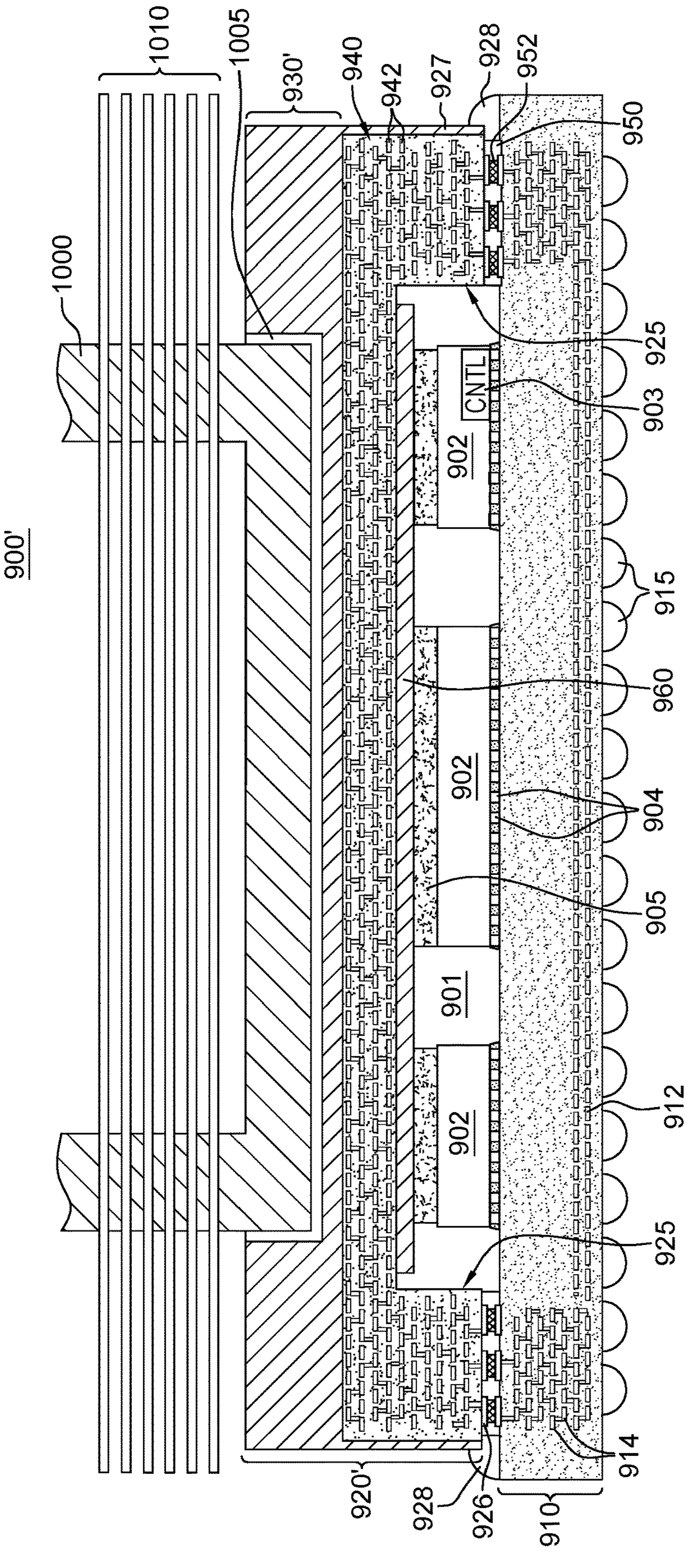
FIG. 10 depicts another embodiment of a tamper-detect assembly including a heat sink cover with a heat sink and integrated tamper-detect circuitry, in accordance with one or more aspects of the present disclosure.

FIG. 10 depicts another embodiment of a tamper-detect assembly 900' similar to tamper-detect assembly 900 of FIG. 9A. The tamper-detect assembly 900' of FIG. 10 includes a heat sink cover 920' similar to heat sink cover 920 described in connection with FIG. 9A, with the exception that the heat sink 930' is an air-cooled heat sink with an integrated heat pipe 1000 attached, for instance, by solder. For example, the integrated heat pipe 1000 is bonded to the heat sink cover 920' via solder once heat sink cover 920' has been formed.

In particular, in one or more embodiments, tamper-detect assembly 900' includes a laminate carrier 910 with embedded tamper-detect circuitry 912, 914 within laminate carrier 910. As noted, in one or more embodiments, laminate carrier 910 can be an organic laminate carrier with embedded tamper-detect circuitry 912 being one or more tamper-detection mat layers, such as tamper-detection mat layers 300 described above in connection with FIG. 3, and embedded tamper-detect circuitry 914 being, for instance, one or more peripheral security layers, or tamper-detection frames, such as tamper-detection frames 301 described above in connection with FIG. 3. In one embodiment, the laminate carrier can include on one side a ball grid array (BGA) 915, or other conductive contact array for operatively coupling the tamper-detect assembly to a larger circuit board, such as described herein.

In the embodiment of FIG. 10, tamper-detect assembly 900' is again depicted as a single multi-chip module package, with one or more electronic components 902, such as one or more semiconductor die, operatively positioned within a secure volume 901 defined between laminate carrier 910 and heat sink cover 920'. As noted above, secure volume 901 can extend above and into laminate carrier 910 within the secure space surrounded by embedded tamper-detect circuitry 912, 914, as illustrated. Electronic component-to-laminate connections 904 are provided to, for instance, electrically connect the individual electronic components to circuitry on or within laminate carrier 910. Further, a thermal interface 905 is shown in FIG. 10 coupling in thermal contact electronic components 902 within secure volume 901 to the underside of heat sink cover 920'. By way of example, a control 903 (CNTL) or control module can be implemented on one or more electronic components 902 within secure volume 901. In one embodiment, control 903 implements a monitor component such as described herein for detecting a tamper event, based on one or more signals being monitored on the tamper-detect circuitry within laminate carrier 910 and within heat sink cover 920', as well as interface security layer 952 connecting the laminate carrier and heat sink cover. One embodiment of a tamper-detect monitor module implemented by control 903 is described further below with reference to the computing environment example of FIG. 13.

As depicted in FIG. 10, heat sink cover 920' (or heat sink lid) includes a heat sink 930' formed of thermally conductive material and configured to receive a heat pipe 1000, for instance, in a channel formed within the thermally conductive material. In one embodiment, heat pipe 1000 can be soldered or braised 1005 into heat sink 930'. Further, in one or more embodiments, a plurality of thermally conductive heat sink fins 1010 can be in physical contact with heat pipe 1000 to facilitate transfer of heat from heat sink 930' to, for instance, the surrounding environment.

In addition to heat sink 930', heat sink cover 920' further includes tamper-detect circuitry 940 integrated within the heat sink cover, with the integrated tamper-detect circuitry 940 of heat sink cover 930' being electrically connected, in one or more embodiments, to the embedded tamper-detect circuitry 912, 914 within laminate carrier 910, by electrical connection through the interface security layer 952 provided at the peripheral interface of heat sink cover 920' and laminate carrier 910, as illustrated. In one or more embodiments, interface security layer 952 is surrounded by a structural adhesive 950, which secures heat sink cover 920' to laminate carrier 910, and encloses one or more electronic components 902 between laminate carrier 910 and heat sink cover 920', with the embedded tamper-detect circuitry 912, 914 of laminate carrier 910 and integrated tamper-detect circuitry 940 of heat sink cover 920' defining, at least in part, secure volume 901 about electronic components 902.

In one or more embodiments, tamper-detect circuitry 940 is integrated within heat sink cover 920' by direct-bonding, or fusion-bonding, tamper-detect circuitry 940 and heat sink 930' together, as well as, in the embodiment illustrated, direct-bonding the tamper-detect circuitry 940 and a thermally conductive base layer 960 of heat sink cover 920'. In the depicted embodiment, thermally conductive base 960 is disposed between tamper-detect circuitry 940 and the one or more electronic components. Further, in the embodiment of FIG. 10, thermal interface material 905 provides a thermal conduction path between the one or more electronic components 902 and thermally conductive base 960 of heat sink cover 920'. In one or more embodiments, thermally conductive base 960 is sized and configured to function as a heat spreader.

In one or more embodiments, tamper-detect circuitry 940 within heat sink cover 920' includes multiple tamper-detect circuit layers 942. In one or more implementations, heat sink 930', tamper-detect circuitry 940, and thermally conductive base 960 of heat sink cover 920' are formed to facilitate direct-bonding together as disclosed herein. For instance, a same conductive material, such as a common metal or common metal composite material could be employed in each, in one embodiment. In one specific embodiment, heat sink 930', tamper-detect circuitry 940, and thermally conductive base layer 960, can each be made of or include copper (or copper traces in the case of tamper-detect circuitry 940). For instance, the tamper-detect circuitry can include multiple dielectric and conductor layers, where the multiple dielectric and conductor layers are (in one embodiment) multiple ceramic and copper layers (i.e., copper trace layers). As noted, in one or more embodiments, the heat sink and thermally conductive base can also be fabricated of copper. Other metals can alternatively be used. However, copper is advantageous due to both its electrical and thermal properties. Copper direct-bonding or fusion-bonding is an established process in the industry. Individual sheets of copper can be patterned, laid-up and exposed to elevated temperatures over, for instance, 1000° C., to induce partial melting of the copper metal in each of the layers, causing the layers to react and bond with one another. A similar process can also be used to adhere copper to electrically insulating, ceramic substrates. This provides the ability to selectively create the layers of conductors and dielectrics to build tamper-detect circuitry, and direct-bond those layers to, for instance, a heat sink and/or thermally conductive base layer fabricated of copper. In this manner, the entire heat sink cover 920' can be formed by direct-bonding or fusion-bonding the heat sink, tamper-detect circuitry, and thermally conductive base layer together, as well as direct-bonding the multiple dielectric and conductor layers of the tamper-detect circuitry, in a common thermal fusion process, such as described herein.

In the embodiment of FIG. 10, heat sink cover 920' is further configured with a heat sink cover sidewall 925 containing, in part, the integrated tamper-detect circuitry 940 of heat sink cover 920'. In the illustrated embodiment, heat sink cover sidewall 925 includes an edge 926 mounted to laminate carrier 910 at the peripheral interface of heat sink cover 920' and laminate carrier 910. In this configuration, tamper-detect circuitry 940 integrated within heat sink cover 920' is, at least in part, also embedded within heat sink cover sidewall 925, as shown. In one or more embodiments, edge plating 927 is provided over heat sink cover sidewall 925 around the periphery of heat sink cover 920' for, for instance, grounding purposes. In addition, a conductive epoxy 928 can be provided as a conductive seal band at the interface of the heat sink cover and laminate carrier.

FIG. 11 depicts another embodiment of a tamper-detect assembly 900" similar to tamper-detect assembly 900 of FIG. 9A, and tamper-detect assembly 900' of FIG. 10. In particular, tamper-detect assembly 900" of FIG. 11 includes a heat sink cover 920" similar to heat sink cover 920 described in connection with FIG. 9A, with the exception that the heat sink 930" is an air-cooled heat sink with a plurality of thermally conductive fins 1100 extending outward to facilitate air-cooling of heat sink 930".

In particular, in one or more embodiments, tamper-detect assembly 900" includes a laminate carrier 910' with embedded tamper-detect circuitry 912, 914 within laminate carrier 910'. As noted, in one or more embodiments, laminate carrier 910' can be an organic laminate carrier, with embedded tamper-detect circuitry 912 being one or more tamper-detection mat layers, such as tamper-detection mat layers 300 described above in connection with FIG. 3, and embedded tamper-detect circuitry 914 being, for instance, one or more peripheral security layers, or tamper-detection frames, such as tamper-detection frames 301 described above in connection with FIG. 3. In one embodiment, the laminate carrier can include on one side a ball grid array (BGA) 915, or other conductive contact array for operatively coupling the tamper-detect assembly to a larger circuit board, such as described herein.

In the embodiment of FIG. 11, tamper-detect assembly 900" is again depicted as a single multi-chip module package, with one or more electronic components 902, such as one or more semiconductor die, operatively positioned within a secure volume 901 defined between laminate carrier 910' and heat sink cover 920". As noted, secure volume 901 can extend above and into laminate carrier 910' within the secure space surrounded by embedded tamper-detect circuitry 912, 914, as illustrated. Electronic component-to-laminate connections 904 are provided to, for instance, electrically connect the individual electronic components to circuitry on or with laminate carrier 910'. Further, a thermal interface 905 is shown in FIG. 11, coupling in thermal contact electronic components 902 within secure volume 901, to the underside of heat sink cover 920". By way of example, a control 903 (CNTL) or control module can be implemented on one or more electronic components 902 within secure volume 901. In one embodiment, control 903 implements a monitor component such as described herein for detecting a tamper event, based on one or more signals being monitored on the tamper-detect circuitry within laminate carrier 910', and within the heat sink cover 920", as well as interface security layer 952 connecting the laminate carrier and the heat sink cover. One embodiment of a tamper-detect module implemented by control 903 is described further below with reference to the computing environment example of FIG. 13.

As depicted in FIG. 11, and noted above, heat sink cover 920" (or heat sink lid) includes a heat sink 930" formed of thermally conductive material and configured with a plurality of thermally conductive fins 1100, such as a plurality of thermally conductive pin fins, to facilitate air-cooling of heat sink 930".

In addition to heat sink 930", heat sink cover 920" further includes tamper-detect circuitry 940' integrated within the heat sink cover, with the integrated tamper-detect circuitry 940' of heat sink cover 930" being electrically connected, in one or more embodiments, to the embedded tamper-detect circuitry 912, 914 within laminate carrier 910', by electrical connection through interface security layer 952 provided at the peripheral interface of heat sink cover 920" and laminate carrier 910', as illustrated. In one or more embodiments, interface security layer 952 is surrounded by a structural adhesive 950, which secures heat sink cover 920" to laminate carrier 910', and encloses one or more electronic components 902 between laminate carrier 910' and heat sink cover 920", with the embedded tamper-detect circuitry 912, 914 of laminate carrier 910' and integrated tamper-detect circuitry 940' of heat sink cover 920" defining, at least in part, secure volume 901 about electronic component 902.

In one or more embodiments, tamper-detect circuitry 940' is integrated within heat sink cover 920" by direct-bonding, or fusion-bonding, tamper-detect circuitry 940' and heat sink 930" together, as well as, in the embodiment illustrated, direct-bonding the tamper-detect circuitry 940' and a thermally conductive base layer 960 of heat sink cover 920". In the depicted embodiment, thermally conductive base layer 960 is disposed between tamper-detect circuitry 940' and the one or more electronic components. Further, in the embodiment of FIG. 11, thermal interface material 905 provides a thermal conduction path between the one or more electronic components 902 and thermally conductive base 960 of heat sink cover 920". In one or more embodiments, thermally conductive base 960 is sized and configured to function as a heat spreader.

In one or more embodiments, tamper-detect circuitry 940' within heat sink cover 920" includes multiple tamper-detect circuit layers 942. In one or more embodiments, heat sink 930", tamper-detect circuitry 940', and thermally conductive base 960 of heat sink cover 920" are formed to facilitate direct-bonding together as disclosed herein. For instance, a same conductive material, such as a common metal or common metal composite material, could be employed in each, in one embodiment. In one specific embodiment, heat sink 930", tamper-detect circuitry 940', and thermally conductive base layer 960 can each be made of, or include, copper (or copper traces in the case of tamper-detect circuitry 940'). For instance, the tamper-detect circuitry can include multiple dielectric and conductor layers, where the multiple dielectric and conductor layers are (in one embodiment) multiple ceramic and copper layers (e.g., copper trace layers). As noted, in one or more embodiments, the heat sink and thermally conductive base can also be fabricated of copper. Other metals can alternatively be used. However, copper is advantageous due to both its electrical and thermal properties. Copper direct-bonding or fusion-bonding is an established process in the industry. Individual sheets of copper can be patterned, laid-up and exposed to elevated temperatures over, for instance, 1000° C., to induce partial melting of the copper metal in each of the layers, causing the layers to react and bond with one another. A similar process can also be used to adhere copper to electrically insulating, ceramic substrates. This provides the ability to selectively build layers of conductors and dielectrics to create the tamper-detect circuitry, and direct-bond those layers to, for instance, a heat sink and/or thermally conductive base layer fabricated of copper. In this manner, the entire heat sink cover 920" can be formed by direct-bonding or fusion-bonding the heat sink, tamper-detect circuitry, and thermally conductive base layer together, as well as direct-bonding the multiple dielectric and conductor layers of the tamper-detect circuitry together, in a common thermal fusion process, such as described herein. In addition, in one or more embodiments, edge plating 927 can be provided over the exposed edges of tamper-detect circuitry 940' around the periphery of heat sink cover 920" for, for instance, grounding purposes. Also, a conductive poxy 928 can be provided as a conductive seal-band at the interface of the heat sink cover and laminate carrier.

In addition, in the embodiment of FIG. 11, laminate carrier 910' is configured with a laminate carrier sidewall 1110 containing, in part, embedded tamper-detect circuitry 914, which as noted, in one or more embodiments, include one or more peripheral security layers, or tamper-detection frames, such as tamper-detection frames 301 described above in connection with FIG. 3. In the illustrated embodiment, laminate carrier sidewall 1110 includes an end 926' to which heat sink cover 920" mounts at the peripheral interface of heat sink cover 920" and laminate carrier 910'.

Figure 12:
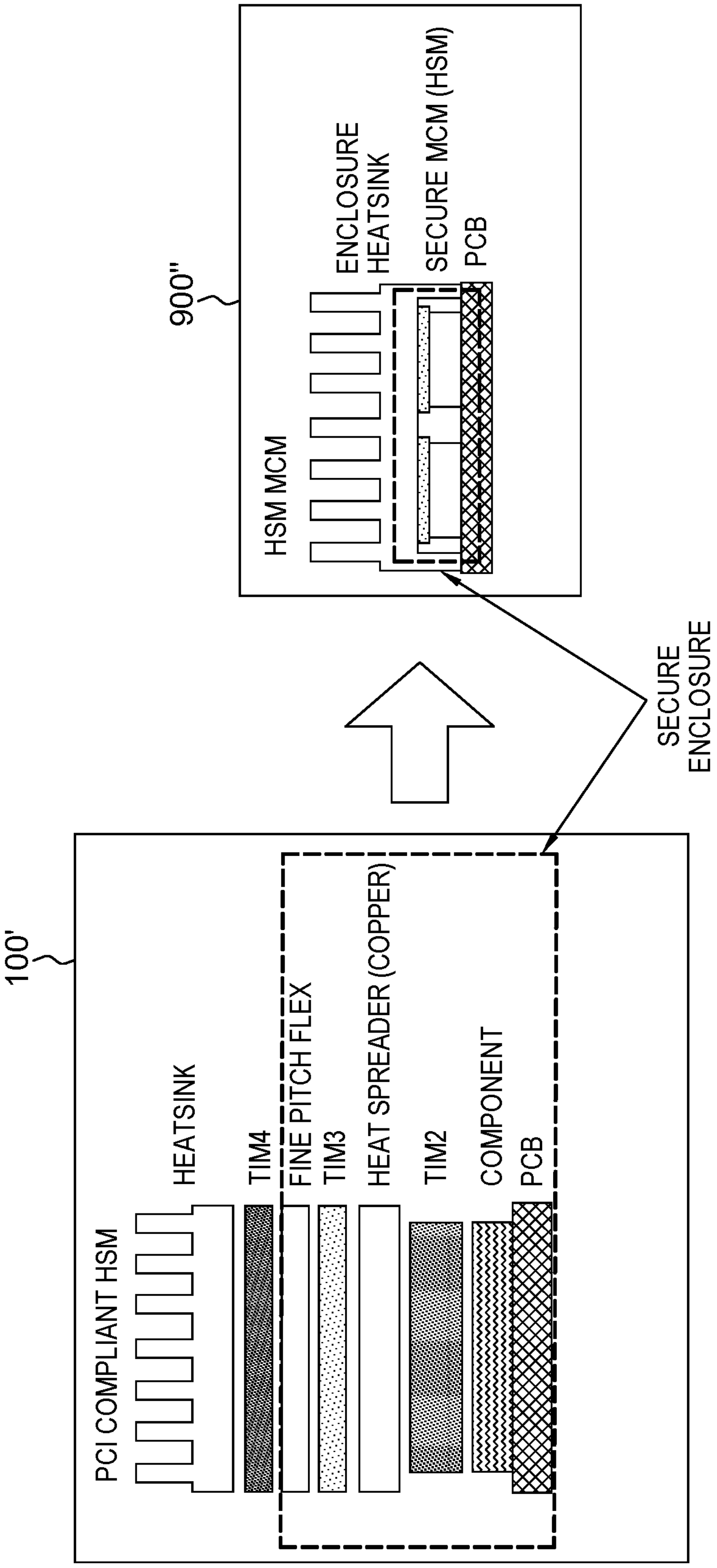
FIG. 12 illustrates a stack-up comparison of a tamper-detect assembly embodiment of FIGS. 1A-3 compared with a tamper-detect assembly embodiment of FIGS. 9A-11, in accordance with one or more aspects of the present disclosure.

By way of example, FIG. 12 illustrates a simplified assembly module version of module assembly 900" of FIG. 11, compared with a conventional PCI-compliant tamper-detect assembly 100', such as tamper-detect assembly 100 of FIGS. 1A-1B. As illustrated, module assembly 900" presents a significant reduction in size over the prior tamper-detect assembly 100' solution. This is accomplished by reducing the number of structural layers in the package to improve both security and thermal conduction. For example, module assembly 900" implements a smaller tamper-detect security envelope. Stated differently, less structure and fewer components are included in the tamper-detect security envelope of the module assembly 900" as compared with the assembly 100' of the prior structures. In turn, the module assembly 900" is less complicated, contains fewer layers/interfaces, is easier to manufacture, and easier to assemble.

One or more aspects of the present disclosure are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform self-tuning merged code test processing, such as disclosed herein. Aspects of the present disclosure are not limited to a particular architecture or environment.

Prior to further describing detailed embodiments of the present disclosure, an example of a computing environment to include and/or use one or more aspects of the present disclosure is discussed below with reference to FIG. 13.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code involved in performing the inventive methods, such as tamper-detect monitor module block 1350. In addition to block 1350, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 1350, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

Computer 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 13. On the other hand, computer 1301 is not required to be in a cloud except to any extent as may be affirmatively indicated.

Processor set 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in block 1350 in persistent storage 1313.

Communication fabric 1311 is the signal conduction paths that allow the various components of computer 1301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1312 is any type of volatile memory now known or to be developed in the future. Examples include dynamic type random access memory (RAM) or static type RAM. Typically, the volatile memory is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

Persistent storage 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface type operating systems that employ a kernel. The code included in block 1350 typically includes at least some of the computer code involved in performing the inventive methods.

Peripheral device set 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

Network module 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on.

Remote server 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

Public cloud 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

The computing environment described above is only one example of a computing environment to incorporate, perform and/or use one or more aspects of the present disclosure. Other examples are possible. Further, in one or more embodiments, one or more of the components/modules of FIG. 13 need not be included in the computing environment and/or are not used for one or more aspects of the present disclosure. Further, in one or more embodiments, additional and/or other components/modules can be used. Other variations are possible.

Figure 13:
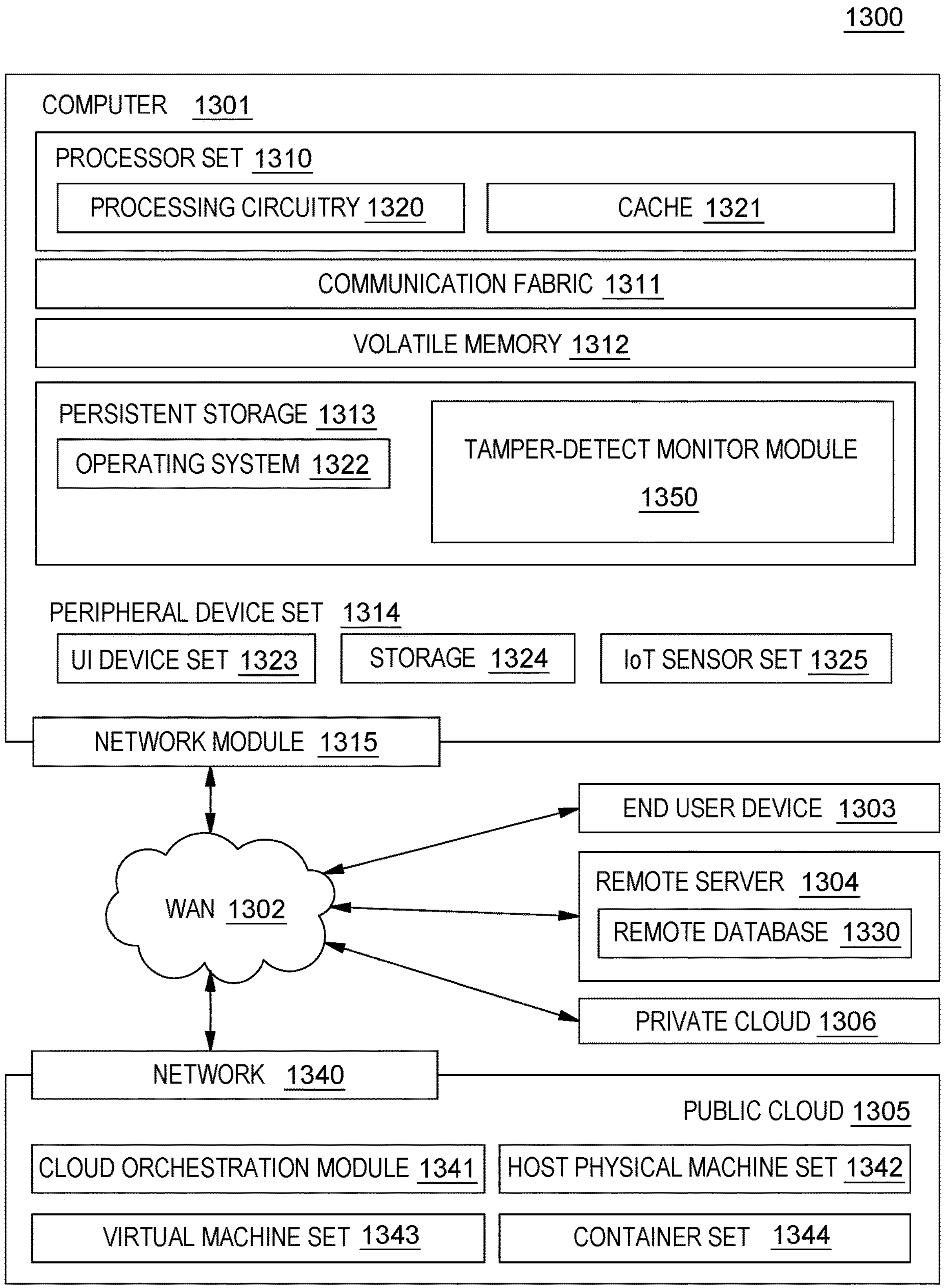
FIG. 13 depicts one example of a computing environment to facilitate and/or implement one or more aspects of the present disclosure.

The tamper-detect monitor module 1350 depicted in FIG. 13 can include, in one or more examples, various sub-modules used to perform processing, in accordance with one or more aspects of the present disclosure. The sub-modules can be, for instance, computer-readable program code (e.g., instructions) and computer-readable media (e.g., persistent storage (e.g., persistent storage 1313, such as a disc) and/or a cache (e.g., 1321), as examples). The computer-readable program code can be part of a computer program product and can be executed by and/or using one or more computers, such as computer(s) 1301; processors, such as a processor or processor set 1310; and/or processing circuitry, such as processor set 1310, etc.

In one example, the sub-modules of tamper-detect monitor module 1350 can include an obtain sensor data sub-module for obtaining the sensor data or signals from the tamper-detect circuitry, a compare sub-module for comparing the sensor signals to, for instance, themselves, historical values, and/or threshold values of acceptable readings to determine whether the sensor signals match, are within a set threshold, or are otherwise deemed normal. If not, then an abnormal condition is detected, and a tamper-detect flag(s) can be set to initiate, for instance, erasure of any confidential data within the secure volume.

The terminology used herein is for the purpose of describing particular embodiments only and is not intended to be limiting of the disclosure. As used herein, the singular forms "a", "and" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A tamper-detect assembly comprising:

a laminate carrier with embedded tamper-detect circuitry within the laminate carrier;

one or more electronic components on the laminate carrier; and a heat sink cover, the heat sink cover comprising a heat sink and tamper-detect circuitry integrated within the heat sink cover, with the tamper-detect circuitry including multiple tamper-detect circuit layers stacked in direct physical contact where adjacent tamper-detect circuit layers in the stack of multiple tamper-detect circuit layers are fused together, and where one tamper-detect circuit layer of the multiple tamper-detect circuit layers is in direct physical contact with and is fused to the heat sink within the heat sink cover, the adjacent tamper-detect circuit layers being fused together and the one tamper-detect circuit layer and the heat sink being fused together to facilitate thermal transfer across the multiple tamper-detect circuit layers to the heat sink, and the heat sink cover being mounted to the laminate carrier and enclosing the one or more electronic components between the laminate carrier and the heat sink cover, wherein together the integrated tamper-detect circuitry of the laminate carrier and the embedded tamper-detect circuitry of the heat sink cover define, at least in part, a secure volume about the one or more electronic components.

2. The tamper-detect assembly of claim 1, wherein the multiple tamper-detect circuit layers each comprises a dielectric material and a conductive material in direct physical contact with at least one adjacent tamper-detect circuit layer in the stack of multiple tamper-detect circuit layers.

3. The tamper-detect assembly of claim 2, wherein the dielectric material comprises ceramic and the conductive material comprises copper, and wherein the heat sink comprises copper.

4. The tamper-detect assembly of claim 2, wherein the heat sink cover further comprises a thermally conductive base, and the stack of multiple tamper-detect circuit layers are fused to both the heat sink and the thermally conductive base of the heat sink cover.

5. The tamper-detect assembly of claim 1, wherein the tamper-detect assembly is a single multi-chip module package, the one or more electronic components comprise one or more semiconductor die, and the laminate carrier includes an electrical contact array on one side of the laminate carrier for electrically coupling the single multi-chip module package to a circuit board.

6. The tamper-detect assembly of claim 1, wherein the heat sink cover is mounted to the laminate carrier at a peripheral interface of the heat sink cover and laminate carrier, and wherein the tamper-detect circuitry integrated within the heat sink cover is electrically connected to the embedded tamper-detect circuitry within the laminate carrier at the peripheral interface of the heat sink cover and laminate carrier via an interface security layer.

7. The tamper-detect assembly of claim 6, wherein the heat sink cover includes a heat sink cover sidewall with an edge mounted to the laminate carrier at the peripheral interface of the heat sink cover and laminate carrier, the tamper-detect circuitry integrated within the heat sink cover being, at least in part, embedded within the heat sink cover sidewall.

8. The tamper-detect assembly of claim 6, wherein the laminate carrier includes a laminate carrier sidewall, the heat sink cover being mounted to an end of the laminate carrier sidewall, and the embedded tamper-detect circuitry within the laminate carrier being, at least in part, embedded within the laminate carrier sidewall.

9. The tamper-detect assembly of claim 1, wherein the heat sink is selected from the group consisting of a coolant-cooled heat sink, an air-cooled heat sink, and an air-cooled heat sink with an integrated heat pipe.

10. A tamper-detect assembly comprising:

a laminate carrier with embedded tamper-detect circuitry within the laminate carrier;

one or more electronic components on the laminate carrier; and a heat sink cover with tamper-detect circuitry integrated within the heat sink cover, the heat sink cover being mounted to the laminate carrier and enclosing the one or more electronic components between the laminate carrier and the heat sink cover, wherein together the embedded tamper-detect circuitry of the laminate carrier and the integrated tamper-detect circuitry of the heat sink cover define, at least in part, a secure volume about the one or more electronic components, and wherein the heat sink cover comprises:

a heat sink;

a thermally conductive base; and wherein the integrated tamper-detect circuitry of the heat sink cover is disposed between and in direct physical contact with and fused to the heat sink and the thermally conductive base of the heat sink cover, wherein the integrated tamper-detect circuitry includes multiple tamper-detect circuit layers stacked in direct physical contact, where adjacent tamper-detect circuit layers in the stack of multiple tamper-detect circuit layers are in direct physical contact and are fused together and one tamper-detect circuit layer of the multiple tamper-detect circuit layers is in direct physical contact with and fused to the heat sink of the heat sink cover and another tamper-detect circuit layer of the multiple tamper-detect circuit layers is in direct physical contact with and fused to the thermally conductive base of the heat sink cover.

11. The tamper-detect assembly of claim 10, wherein each tamper-detect circuit layer of the multiple tamper-detect circuit layers comprises a dielectric material and a conductive material in direct physical contact with at least one adjacent tamper-detect circuit layer in the stack of multiple tamper-detect circuit layers.

12. The tamper-detect assembly of claim 11, wherein the dielectric material comprises ceramic and the conductive material comprises copper, and wherein the heat sink comprises copper.

13. The tamper-detect assembly of claim 10, wherein the tamper-detect assembly is a single multi-chip module package, the one or more electronic components comprise one or more semiconductor die, and the laminate carrier includes an electrical contact array on one side of the laminate carrier for electrically coupling the single multi-chip module package to a circuit board.

14. The tamper-detect assembly of claim 10, wherein the heat sink cover is mounted to the laminate carrier at a peripheral interface of the heat sink cover and laminate carrier, and wherein the tamper-detect circuitry integrated within the heat sink cover is electrically connected to the embedded tamper-detect circuitry within the laminate carrier at the peripheral interface of the heat sink cover and laminate carrier via an interface security layer.

15. The tamper-detect assembly of claim 14, wherein the heat sink cover includes a heat sink cover sidewall with an edge mounted to the laminate carrier at the peripheral interface of the heat sink cover and laminate carrier, the tamper-detect circuitry integrated within the heat sink cover being, at least in part, embedded within the heat sink cover sidewall.

16. The tamper-detect assembly of claim 14, wherein the laminate carrier includes a laminate carrier sidewall, the heat sink cover being mounted to an end of the laminate carrier sidewall, and the embedded tamper-detect circuitry within the laminate carrier being, at least in part, embedded within the laminate carrier sidewall.

17. The tamper-detect assembly of claim 10, wherein the heat sink is selected from the group consisting of a coolant-cooled heat sink, an air-cooled heat sink, and an air-cooled heat sink with an integrated heat pipe.

18. A method of fabricating a tamper-detect assembly, the method comprising:

forming a laminate carrier with embedded tamper-detect circuitry within the laminate carrier;

providing one or more electronic components on the laminate carrier;

providing a heat sink cover comprising a heat sink and a tamper-detect circuitry, wherein the tamper-detect circuitry comprises multiple tamper-detect circuit layers stacked in direct physical contact where adjacent tamper-detect circuit layers in the stack of multiple tamper-detect circuit layers are fused together and where one tamper-detect circuit layer of the multiple tamper-detect circuit layers is in direct physical contact with and is fused to the heat sink within the heat sink cover, the adjacent tamper-detect circuit layers being fused together and the one tamper-detect circuit layer and heat sink being fused together to facilitate thermal transfer across the multiple tamper-detect circuit layers to the heat sink; and mounting the heat sink cover to the laminate carrier to enclose the one or more electronic components between the laminate carrier and the heat sink cover, wherein together the embedded tamper-detect circuitry of the laminate carrier and the tamper-detect circuitry of the heat sink cover define, at least in part, a secure volume about the one or more electronic components.

19. The method of claim 18, wherein each tamper-detect circuit layer of the multiple tamper-detect circuit layers comprises a dielectric material and a conductive material in direct physical contact with at least one adjacent tamper-detect circuit layer in the stack of multiple tamper-detect circuit layers.

20. The method of claim 19, wherein the dielectric material comprises ceramic and the conductive material comprises copper, and wherein the heat sink comprises copper.

21. The method of claim 18, wherein the heat sink cover further comprises a thermally conductive base, and providing the heat sink cover includes positioning the multiple tamper-detect circuit layers, at least in part, between the heat sink and the thermally conductive base, and applying heat to the heat sink cover to fuse the multiple tamper-detect circuit layers together and to fuse the stack of multiple tamper-detect circuit layers to the heat sink and to the thermally conductive base of the heat sink cover.

22. The method of claim 18, wherein the tamper-detect assembly is a single multi-chip module package, the one or more electronic components comprise one or more semiconductor die, and the laminate carrier includes an electrical contact array on one side of the laminate carrier for electrically coupling the single multi-chip module package to a circuit board.

23. The method of claim 18, wherein the heat sink is selected from the group consisting of a coolant-cooled heat sink, an air-cooled heat sink, and an air-cooled heat sink with an integrated heat pipe.

* * * * *